US008639632B2

(12) United States Patent
Zurada

(10) Patent No.: US 8,639,632 B2
(45) Date of Patent: Jan. 28, 2014

(54) SYSTEMS AND METHODS USED FOR PUBLISHING AND AGGREGATING REAL WORLD AND ONLINE PURCHASES VIA STANDARDIZED PRODUCT INFORMATION

(75) Inventor: Mark Zurada, New York, NY (US)

(73) Assignee: Shopography LLC, New York, NY (US)

( * ) Notice: Subject to any disclaimer, the term of this patent is extended or adjusted under 35 U.S.C. 154(b) by 18 days.

(21) Appl. No.: 13/271,178

(22) Filed: Oct. 11, 2011

(65) Prior Publication Data

US 2012/0030032 A1     Feb. 2, 2012

Related U.S. Application Data

(63) Continuation of application No. 13/081,492, filed on Apr. 6, 2011.

(60) Provisional application No. 61/321,504, filed on Apr. 7, 2010.

(51) Int. Cl.
*G06Q 30/00* (2012.01)

(52) U.S. Cl.
USPC ........................................................ 705/319

(58) Field of Classification Search
USPC ............................................. 707/3; 705/7.33
See application file for complete search history.

(56) References Cited

U.S. PATENT DOCUMENTS 5,974,396 A * 10/1999 Anderson et al. ............ 705/7.33
7,614,552 B2   11/2009 Roseman et al.
7,904,333 B1    3/2011 Perkowski 2002/0026390 A1   2/2002 Ulenas et al.
2009/0070219 A1*  3/2009 D'Angelo et al. ............ 705/14
2009/0265257 A1  10/2009 Klinger et al.
2009/0271289 A1  10/2009 Klinger et al.
2009/0281854 A1  11/2009 Chappen
2009/0282002 A1* 11/2009 Reeder et al. ................... 707/3
2010/0257038 A1  10/2010 Shipley
2010/0306099 A1  12/2010 Hirson et al.
2011/0004517 A1   1/2011 Soto et al.
2011/0029364 A1   2/2011 Roeding
2011/0055005 A1   3/2011 Lang

FOREIGN PATENT DOCUMENTS

WO   2005106744   11/2005
WO   2007127159   11/2007

OTHER PUBLICATIONS

Zurada, Mark; Final Office Action for U.S. Appl. No. 13/081,492, filed Apr. 6, 2011, mailed Jul. 30, 2013, 36 pgs.
Zurada, Mark; U.S. Patent Application Entitled: Systems and Methods Used for Publishing and Aggregating Real World and Online Purchases via Standardized Product Information, U.S. Appl. No. 13/081,492, filed Apr. 6, 2011; 51 pgs.
Zurada, Mark; U.S. Provisional Application entitled: Systems and Methods Used for Publishing and Aggregating Real World and Online Purchases via Standardized Product Information, filed Apr. 7, 2010, 44 pgs.
Zurada, Mark; Non-Final Office Action for U.S. Appl. No. 13/081,492, filed Apr. 6, 2011, mailed Feb. 26, 2013, 34 pgs.

* cited by examiner

*Primary Examiner* — Saba Dagnew
(74) *Attorney, Agent, or Firm* — Taylor English Duma

(57) ABSTRACT

The present disclosure relates to enabling users to broadcast their purchases by means of a service provider. Service provider catalogs such purchases based on standardized product data, such as UPC or RFID, allowing for the aggregation and consequent utility of such data for commercial purposes.

25 Claims, 20 Drawing Sheets

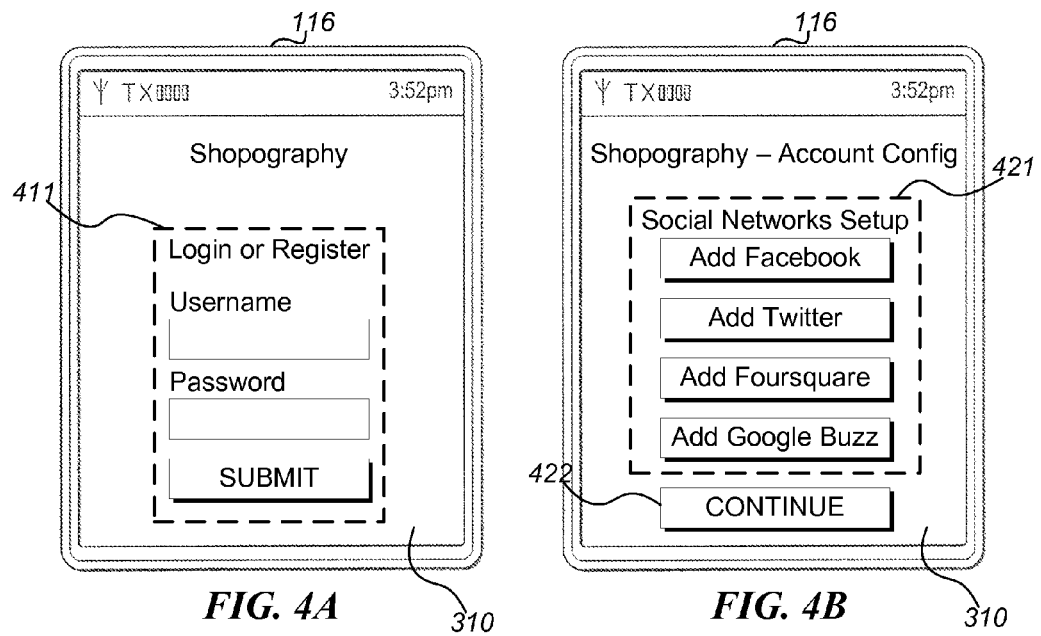
FIG. 4A     FIG. 4B
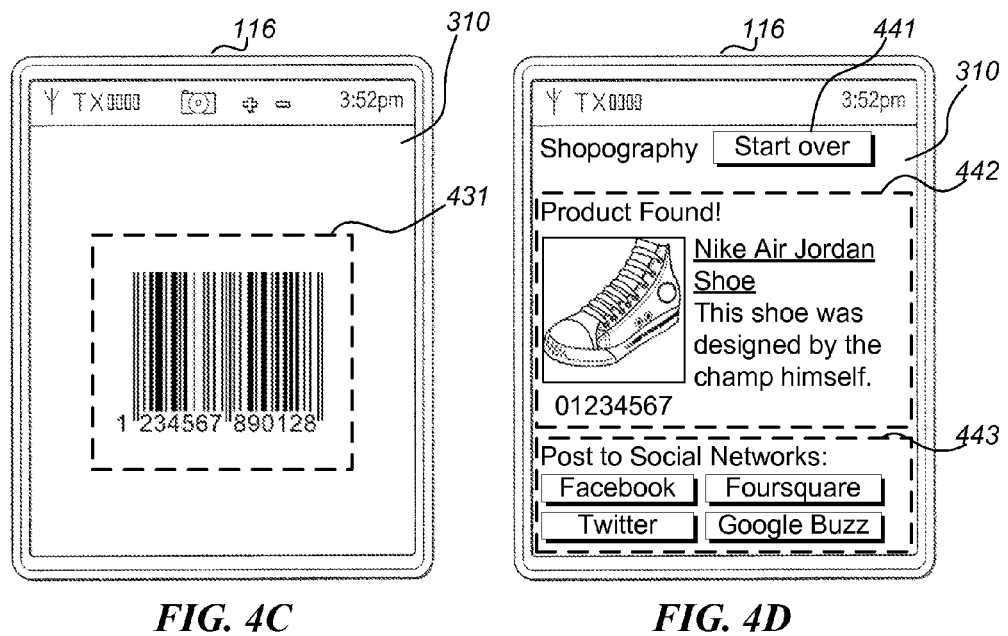
FIG. 4C     FIG. 4D

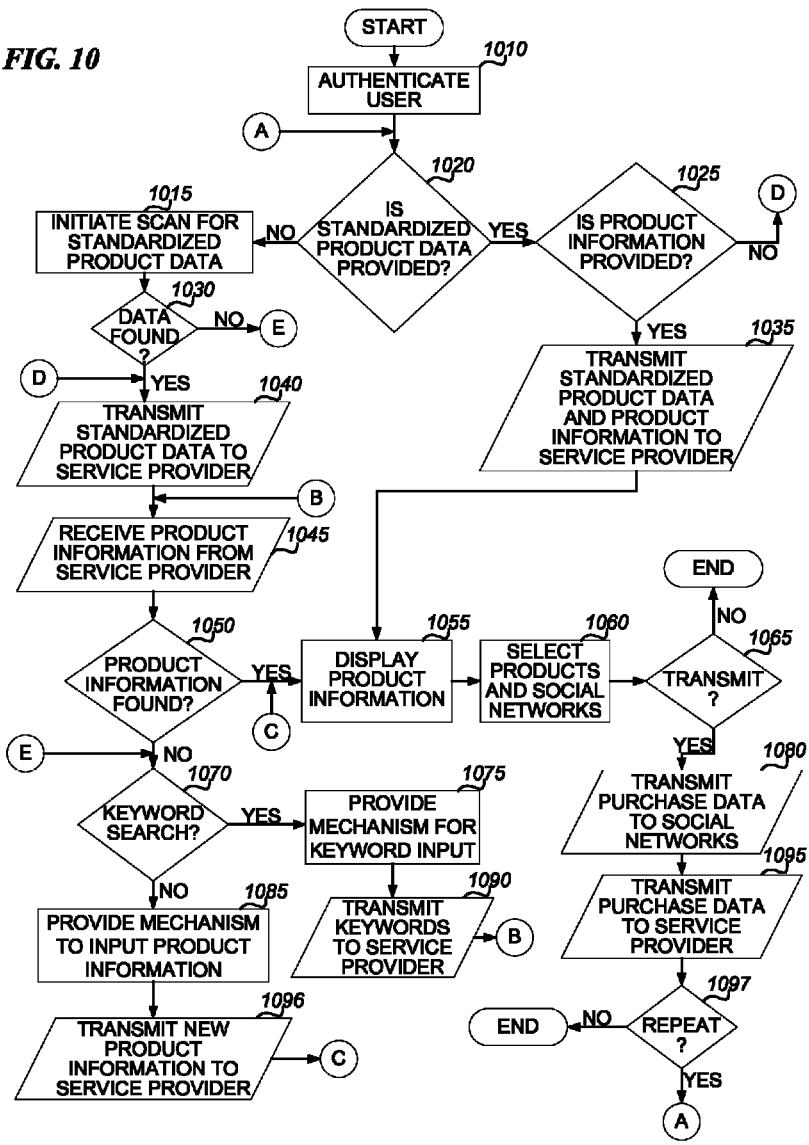

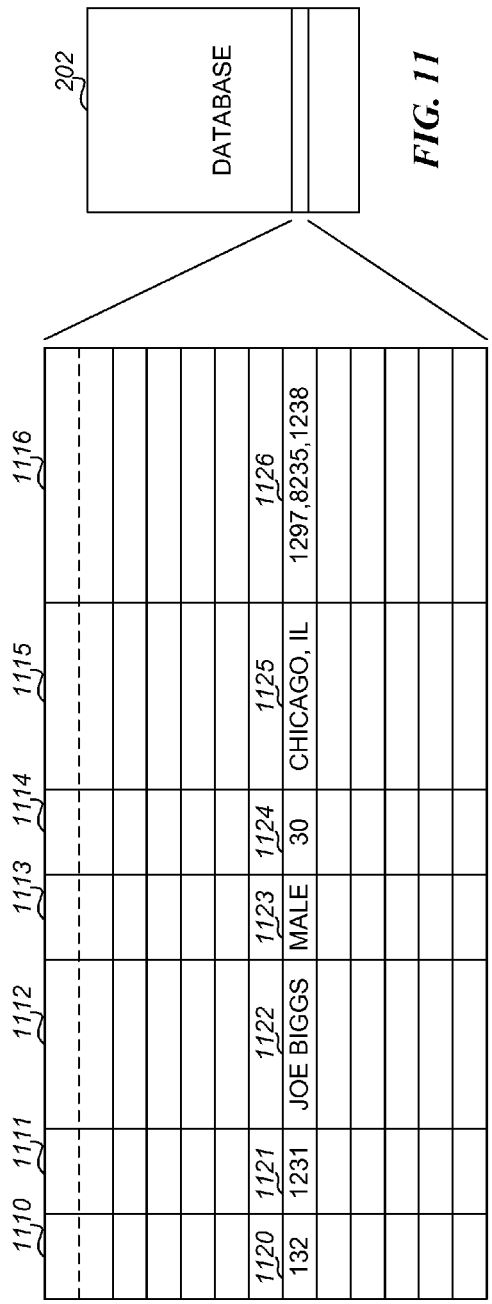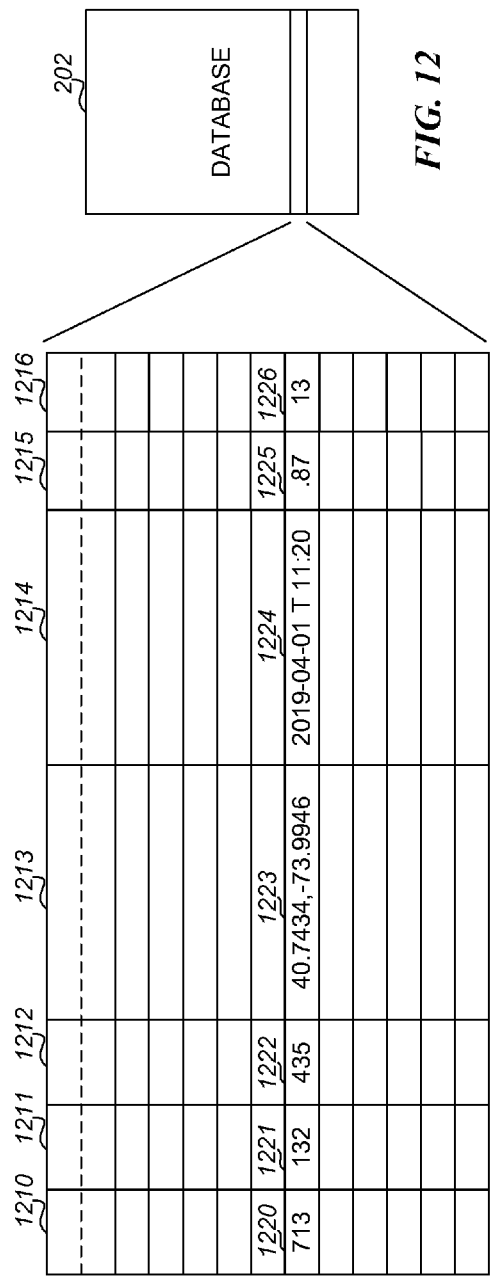

SYSTEMS AND METHODS USED FOR PUBLISHING AND AGGREGATING REAL WORLD AND ONLINE PURCHASES VIA STANDARDIZED PRODUCT INFORMATION

CROSS-REFERENCE TO RELATED APPLICATIONS

This application is a continuation of U.S. patent application Ser. No. 13/081,492 filed on Apr. 6, 2011, which claims the benefit of U.S. Provisional Application No. 61/321,504 filed on Apr. 7, 2010, the entire disclosures of which are hereby incorporated by reference.

FIELD

This disclosure relates to a method and system for receiving and cataloguing consumers' purchase data based on UPC, EPC, barcode, radio-frequency identification tag, or any other standardized product identification tag; to the publication and distribution of descriptive information regarding such data; and to the aggregation of such data for market assessment, advertisement sales and delivery, and product sales.

BACKGROUND

With the burgeoning growth of online social networks, consumers are growing increasingly accustomed and interested in sharing content relating to their personal lives and interests. For example, on Facebook alone, users share more than 5 billion pieces of content per week. Such pieces of content can include web links, news stories, blog posts, notes, and photo albums, but can also be custom tailored to display any sort of information. Upon sharing, users receive comments and feedback relating to the content, and in such a manner, they engage in virtualized social conversation.

With the advancement and proliferation of mobile phone technologies, an increasing number of users are engaging with and sharing content on social networks via their mobile devices. Sharing content via mobile devices adds other dimensions to that which can be accomplished via a personal computer. For example, users can instantly share on their social network profile a photo taken via their mobile phone. Furthermore, such a photo can be tagged with information regarding the user's location on the planet.

From such an unprecedented desire and capability to share information, a need emerges for a method and system for users to share information regarding their purchases, to express their styles of consumerism in a virtual setting, and to engage in conversation on the topic. Such a need is evident based on an analysis of the physical world where, for example, people tend to display or speak of their purchases and brand associations as a matter of everyday life. Likewise, people derive pleasure in announcing how often they shop, how much quantity or quality they purchase, and how much they save or splurge on a particular item.

Furthermore, an ever-present need exists for merchants and brands to more effectively market and advertise their products to potential consumers, a need that is fulfilled by the aggregation of data accumulated by consumers sharing their purchase information via social networks. Such data may, for example, include precise information regarding age, gender, social status, and location of a purchase with regard to the sales of a particular product or category of products. Such data can, for example, be employed to target advertisements in a precise manner, to analyze real-time sales trends, and guide retailers in stocking inventory.

SUMMARY

The following presents a simplified summary of the disclosure. This summary is not an extensive overview. It is not intended to identify key or critical elements or to delineate the scope. The sole purpose of the summary is to present some concepts in a simplified form as a prelude to the more detailed description presented later.

Disclosed herein are systems and methods, including computer program products, that implement techniques related to the integration of social networking services; mobile devices and e-commerce websites; and consumers' purchase histories from either or both of the physical and virtual worlds.

In a general aspect, one embodiment disclosed is a computer program product in a computer readable medium for registering a user account via a mobile base station (e.g., mobile phone, laptop, PDA, smart-phone) and computer (e.g., a web server which may include server computer systems and database systems). User preferred account registration information is transmitted to a computer and recorded in a database, and subsequently, a method is initiated for linking social networking accounts to the newly-created user account. In a variation, the registration method may include registering a new user account based solely on a social network account.

In a related aspect, the computer program product in a computer readable medium includes a method for scanning physical goods for standardized product identification (e.g., UPC, EPC, barcodes, radio-frequency identification tag, among others), and computer readable code for transmitting such identification to a computer (e.g., a web server which may include server computer systems and database systems), and for the reception of a response containing data describing the product. Such data can be characterized by, but not limited to, the product name, a product description, a product image, the product type, the product category, a range of product prices available in the stream of commerce, product availability in the stream of commerce, and a list of merchants selling the product. In a variation, the method may include generating revenue based on targeted marketing promotional messages or advertisements transmitted from a computer (e.g., a web server which may include server computer systems and database systems) directly to a user's mobile device, where targeted marketing is based on a user's instant scan, on a history of user's past purchases, and/or an aggregate of marketing and social factors.

In another general aspect, another embodiment is a second computer program product in a computer readable medium for registering a new user account via a user interface displayed on a website (e.g., a third party ecommerce site) and a computer (e.g., a web server which may include server computer systems and database systems). User preferred account registration information is transmitted to a computer and recorded in a database, and subsequently, a method is initiated for linking social networking accounts to the newly-created user account. In a variation, the registration method may include registering a new user account based solely on a social network account.

In a related aspect, the computer program product in a computer readable medium includes a method for transmitting standardized product information (e.g., barcode, the address of a webpage containing such information as meta data) pertaining to a user's purchase of goods on a website (e.g., a third-party ecommerce web site) to a computer (e.g., a web server which may include server computer systems and database systems) and for the recording of such information in a database. In a variation, such transmission may also contain descriptive information regarding the product (e.g., an image, the product name, a product description) and merchant.

In another general aspect, one embodiment is a computer program product in a computer readable medium capable of receiving a request from a source (e.g., mobile base station or website) demanding descriptive product information based on standardized product data (e.g., barcode, radio-frequency identification tag). Computer program product also includes a method for returning a response containing descriptive product information and for cataloging such information in a database. Such descriptive product information can be characterized by, but not limited to, the product name, a product description, a product image, the product type, the product category, a range of product prices available in the stream of commerce, product availability in the stream of commerce, and a list of merchants selling the product.

In a related aspect, the computer program product in a computer readable medium may include a method to initiate a request carrying standardized product data (e.g., barcode, radio-frequency identification tag) from a computer (e.g., a web server which may include server computer systems and database systems) to a plurality of web services (e.g., Amazon Services, Google Products, Commission Junction, BestBuy Remix); for the reception of a response in the form of descriptive product information; and for the cataloging of such information in a database. In a variation, such request may be initiated and such reception may be accepted directly from a mobile base station (e.g., mobile phone, laptop, PDA, smart-phone) and subsequently transmitted to a computer for cataloging in a database.

In a related aspect, the computer program product in a computer readable medium may query an internal database or cache for such descriptive product information.

In a related aspect, the computer program product in a computer readable medium may include a method for controlling the order and manner in which web services, internal databases, and caches are accessed or queried.

In another general aspect, one embodiment is a computer program product in a computer readable medium for initiating the transmission of user's purchase data from a computer (e.g., a web server which may include server computer systems and database systems) to the user's profile on a social network environment (e.g., FACEBOOK, TWITTER, FOURSQUARE, GOOGLE BUZZ) and for the recording of such transmission in a database. Such purchase data may be characterized by, but not limited to, an image or video of the product, the name of the product, a description of the product, the price for which the product was purchased, a range of product prices available in the stream of commerce, a user-defined message regarding the purchase, the location of the purchase or transmission, a list of friends who have also purchased the product, a list of user friends who are likely to be interested in the product, the merchant from which the product was purchased, a sponsored or unsponsored link to a webpage containing additional information about the product, and an advertisement bearing relationship to the product and/or purchaser. In an alternative embodiment, such transmission can be initiated directly from a mobile base station (e.g., mobile phone, laptop, PDA, smart-phone).

In a related aspect, such transmission can be accompanied by a user-generated rating of the product as a measure of two independent factors: desirability and value. A unique visual or graphical user interface (GUI) is employed to enable user submission of such a rating. The GUI is characterized by a box with labels on each of its four sides with desirability labels being opposite each other (e.g., "cool" and "lame") and value labels likewise being opposite (e.g., "worth it" and "not worth it"). It is further characterized as consisting of a target graphic placed within such a box that is movable within its bounds. The GUI is then operable via an input device (e.g., mouse, keyboard, touchscreen) wherein the user drags and drops the target at a position within the box that represents the user's assessment of the purchase and/or product. The proximity of the target to a particular label signifies the user's intent to rate the purchase and/or product in such a manner.

In a related aspect, such transmission to a user's profile can further include information for generating revenue based on the number of "click-throughs" on links regarding the product (e.g., bidding on a referral fee for a particular product or product category, optionally narrowed by available targeting criteria). Still further, such transmission to a user's profile may include of a financial transaction that is a function of the marketing efforts of merchants (e.g., bidding on a link for a particular product or product category, optionally narrowed by available targeting criteria).

In another general aspect, one embodiment is a computer program product in a computer readable medium including a computer (e.g., a web server which may include server computer systems and database systems) for the generation of documents and data streams (e.g., web pages, XML data).

In a related aspect, the computer program product in a computer readable medium may include a method for such generation as a result of the aggregation of purchase data with regard to, for example, standardized product information (e.g., barcode, radio-frequency identification tag), social data (e.g., sex, age, education, friendships), location data, product similarities, product categories, or third-party marketing desires, or any combination thereof. Still further, such generation may be influenced by "clustering," herein referring to most any algorithm of relating such data with the environment. Still further, such generation may be the result of rules-based logic or machine learning & reasoning (MLR) components that employ probabilistic and/or statistical-based analysis to infer an action that a viewer desires to be automatically performed. For example, such methods can result in the automatic display of recommended products, relevant advertisements, or filtered data streams in a highly tailored, viewer- and/or product-specific manner.

In a related aspect, the computer program product in a computer readable medium may include a method for broad distribution of such data to public and private parties via, for example, an application programming interface. Such transmission may include a method for generating revenue based on, for example, the scope of desired access, whether the intended use of such data is commercial or otherwise, and so forth.

In a related aspect, the computer program product in a computer readable medium may include a method for including in such documents and data streams user-generated communication with regard to a product as aggregated from social networks.

In another general aspect, one embodiment is a computer program product in a computer readable medium including a computer (e.g., a web server which may include server computer systems and database systems) for the generation of interactive documents, which in the aggregate form constitute a marketplace in which merchants and marketers compete for association with a specific product based on its standardized product information (e.g., barcode, radio-frequency identification tag). Such association can be acquired, for example, by outbidding others and can result in having the winning bidder's link or advertisement viewed in relation to product.

In a related aspect, the computer program product in a computer readable medium may include a method for binding parties in contract for desired advertising services and conducting related financial transactions.

To the accomplishment of the foregoing and related ends, certain illustrative aspects, features, and embodiments are described herein in connection with the following description and the included drawings. These aspects are indicative, however, of but a exemplary embodiments of the various features and aspects of the disclosure, and the disclosure is not intended to be limited by any particular features or embodiments. Other advantages and novel features will become apparent from the following detailed description when considered in conjunction with the drawings and the level of ordinary skill in the art.

These and other systems, methods, objects, features, and advantages will be apparent to those skilled in the art from the following detailed description of the preferred embodiment and the drawings. All documents mentioned herein are hereby incorporated in their entirety by reference.

BRIEF DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

FIGS. 4A through 4E illustrate one embodiment of a sequence for a mobile device 116 in which the user 112 authenticates with the service provider 100, scans a physically-held product for barcode information, posts to a social network 120, and rates a product purchase 2000.

FIG. 10 is a flow diagram of the user interface process illustrated in FIG. 9.

FIG. 11 illustrates an example of a relational data model of user information.

FIG. 12 illustrates an example of a relational data model of purchase information.

DETAILED DESCRIPTION

The following description is presented to enable one skilled in the art to make and use the elements of the disclosure and is provided in the context of particular applications and their requirements. Thus, the following description of embodiments consistent with the present disclosure provides illustration and description but is not intended to be exhaustive or limiting to the precise form disclosed. Various modifications to the disclosed embodiments will be apparent to those skilled in the art, and the general principles set forth below may be applied to other embodiments and applications. For example, although a series of acts, features, or elements may be described with reference to a flow diagram, the order of such acts, features, or elements may differ in other implementations when the performance of one act is not dependent on the completion of another act. Further, non-dependent acts may be performed in parallel. No element, act or instruction used in the description should be construed as critical or essential to any embodiment disclosed herein unless explicitly described as such. Also, as used herein, the article "a" is intended to include one or more items. Where only one item is intended, the term "one" or similar language is used. Thus, the present disclosure is not intended to be limited to the embodiments shown and described.

Figure 1:
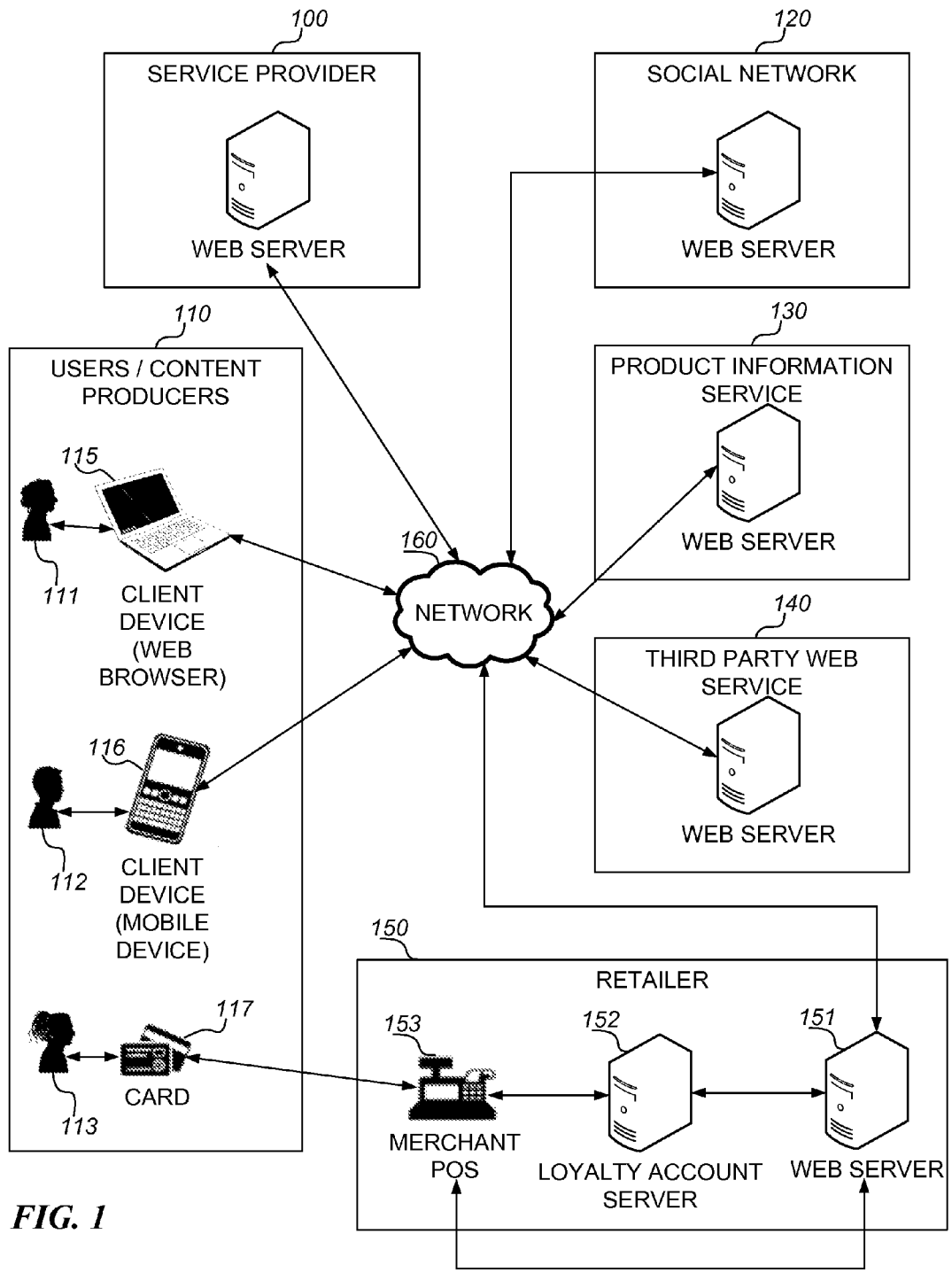
FIG. 1 illustrates a communication system for receiving and publishing purchase information.

FIG. 1 illustrates a simplified communication system for the receiving, storing and publishing of user, product, and purchase information. Not all of the depicted components may be required, however, and some systems may include additional, different, or fewer components not shown in the figure. Variations in the arrangement and type of the components may be made without departing from the spirit or scope of the claims as set forth herein.

User components 110 or content producers are coupled with a service provider 100. Herein, the phrase "coupled with" may mean directly connected to or indirectly connected through one or more intermediate components. Such intermediate components may include both hardware, software or network based components. Variations in the arrangement and type of the components may be made without departing from the spirit or scope of the claims as set forth herein.

Computer 115 is operable to be used by a user 111. For the embodiment shown, the interface for the computer 115 that is supported by the service provider 100 and retailer 150 is a World-Wide Web (WWW) based interface through the service provider 100 and retailer 150 to a network 160 that supports the computer 115. Thus, for this embodiment, the service provider 100 and retailer 150 are servers or processes that store data in the form of web pages and transmit these pages as Hypertext Markup Language (HTML) files over the network 160 to the computer 115, as will be described in more detail below.

For this embodiment, the computer 115 typically runs a web browser program, such as INTERNET EXPLORER or FIREFOX, to access the web pages served by the service provider 100 and retailer 150 and any available content provider or supplemental server that may also be coupled to the network 160. The computer 115 may access the network 160 through an Internet Service Provider (ISP). It should be noted that network 160 may be the Internet, a Wide Area Network (WAN), a Local Area Network (LAN), a Wireless Local Area Network (WLAN), or any combination thereof, among others. The computer 115 may include a keyboard, keypad, or a cursor control device, such as a mouse, or a joystick, touch screen display, remote control or any other device operative to allow a user to interact with the page(s) provided by the service provider 100 and retailer 150.

Mobile device 116 is operable to be used by a user 112. For the embodiment shown, the mobile device 116 interface supported by the service provider 100 is a specific set of program instructions executable to display information, to receive user input, to scan and decipher image, video and/or RFID data, and to receive and transmit data to service provider via a network 160, as will be described in more detail below. If a mobile device 116 does not have such program instructions available, then the user 112 may install such program instructions to provide for such interface. In the alternative, mobile device 116 may interface with service provider 100 via a web browser program in manner similar to computer 115. In another alternative embodiment, the mobile device 116 may include features to operate or to access a mobile device 116 remotely.

Card 117 is operable to be used by a retailer 150 at a point-of-sale (POS) terminal 153. For the embodiment shown, the card 117 is a retailer loyalty card or credit card with sufficient information for service provider 100 to identify user 113 or cause user 113 to be identified; for retailer 150 to identify user 113 or cause user 113 to be identified; or for any combination thereof. By way of example, a user's 113 retailer loyalty card 117 may be swiped or scanned at a merchant POS terminal 153 causing an identifying communication to be initiated with a retailer loyalty account server 152. Such identifying communication may produce an email address of the user 113, which can then be communicated from retailer's web server 151 to service provider 100, causing user 113 to be identified and registered with service provider 100. In a variation, card 117 can be any device, such as a user's 113 personal RFID identification, allowing for retailer 150 to identify user or cause user to be identified with service provider 100.

Service provider 100 is coupled with other outside service providers 120, 130, 140, and 150 and contains one or more program components. Such intermediate components may include both hardware, software, or network based components, such as an Application Programming Interface (API). Variations in the arrangement and type of the components may be made without departing from the spirit or scope of the claims as set forth herein.

For the embodiment shown, social network 120 is operable to communicate with service provider 100 via network 160. Users 111,112,113 may maintain accounts with social network 120, and social network allows each of its users to define their own profile data and define the boundaries of interaction with other users or service providers associated with its system.

For the embodiment shown, product information service 130 is operable to communicate with service provider 100 via network 160. Product information service 130 contains descriptive information about products available in the stream of commerce and allows for service provider 100 to retrieve such information from its data store.

For the embodiment shown, third party web service 140 is operable to communicate with service provider 100 via network 160. Third party web service 140 can provide any sort of services to its end users and can retrieve aggregated or streaming purchase data from service provider 100 in wholesale or via a narrowed query.

Figure 2:
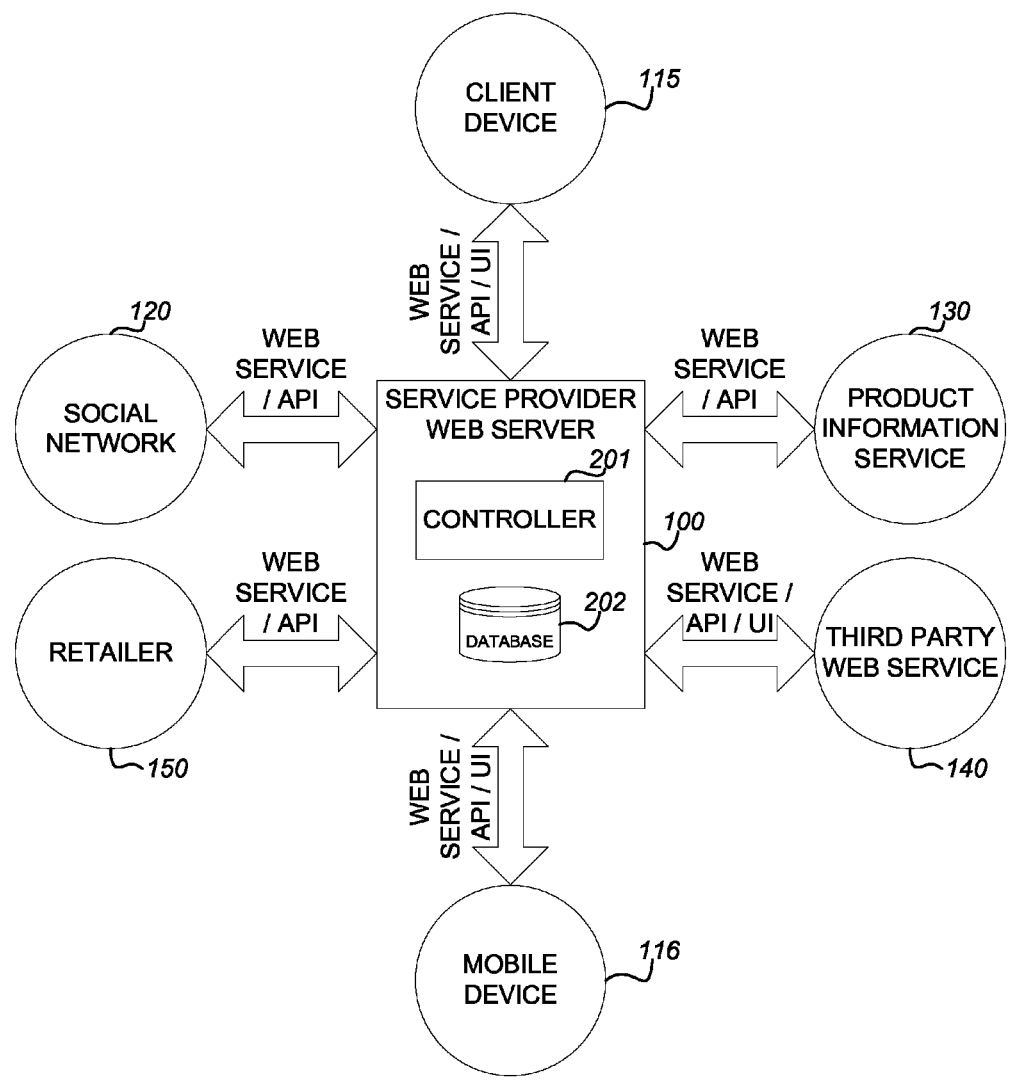
FIG. 2 is a block diagram of a service provider 100 and system to integrate computer 115, mobile device 116, social network 120, product information service 130, third party web service 140, retailer 150, and service provider 100.

FIG. 2 is a block diagram of a service provider 100 and system to integrate computer 115, mobile device 116, social network 120, product information service 130, third party web service 140, retailer 150, and service provider 100 via network 160. A service provider 100 is an entity that provides a type of service to a number of users and third party web services, communicates with devices outside of service provider 100, and provides a user interface. In this example embodiment, service provider 100 is a web server. However, the service provider 100 may be a centralized server or cluster of server computers that maintains the processes and databases for a number of different users, or it may represent a distributed set of computers located in different geographic regions, each serving a different group of users, or it may be any other equivalent or combination thereof.

Service provider 100 includes a database 202 and a controller 201. Controller 201 is used to access data from and store data into database 202 and to communicate with devices outside of service provider 115, 116, 120, 130, 140, and 150 via an Applications Programming Interface (API) or web-based interface. An API of the service provider 100 or other means of command interface may be implemented as XML (eXtensible Markup Language) over HTTP (also referred to as SOAP, Simple Object Access Protocol); embedded objects, such as COM (Component Object Model) or JAVA references; a non-standard command protocol over TCP (Transmission Control Protocol); or using a standard delivery method, such as SMTP (Simple Mail Transfer Protocol), used in electronic mail.

Database 202 is created by the entering in of various types of data from a number of users 115 and 116, outside service providers 120, 140 and 150, and/or automated methods between service provider 100 and product information service 130. In this example embodiment, database 202 includes data entries for a plurality of service provider's 100 users. Furthermore, database 202 includes data entries for a plurality of products. And finally, in this example embodiment, database 202 includes a plurality of data entries for a plurality of user purchases, respectively.

For example, an API that retailer 150 may interface with could serve to provide a web service through a user interface that is transferred to a user of a web browser for display and interaction. The API may provide a way for retailer 150 to interface submission of user 111 purchase data to the service provider 100. As an example, from the receipt and confirmation page of retailer 150 web site may include an embedded interface to service provider 100 that creates new user accounts on service provider 100, authenticates user 111 against database 202 or against social network 120, that transmits and stores product information, that transmits and stores user's 111 purchase information, and causes the initiation of a method to associate or publish user's 111 purchase information to user's 111 social network 120 profile. The API may likewise provide a way for retailer 150 to associate user's 113 card 117 with a new or existing user account on service provider 100, via for example, email communication.

Similarly, as will be described in more detail below, an API that user 112 may interface with could serve to provide a web service through a user interface that is stored on mobile device 116 of user 112 or transferred to a user 112 of a web browser of a mobile device 116 for display and interaction. The API may provide a way for user 112 to interface submission of user's purchase data to the service provider 100. As an example, mobile device 116 can include an interface to service provider 100 that creates new user accounts on service provider 100, that authenticates user 112 against database 202 or against user's social network 120 account, that transmits and stores product information, that transmits and stores user's 112 purchase information, and causes the initiation of a method to associate or publish user's 112 purchase information to user's 112 social network 120 profile.

As another example, an API that service provider 100 may interface with could serve to send and receive data about a user 111,112,113 from social network 120 or data with regard to user's 111,112,113 social network 120 account preferences. The API may furthermore provide a way for user 111,112,113 to associate user's service provider 100 account with user's social network account 120, to associate other data such as purchase data from user's service provider account 100 with user's social network 120 account, and to retrieve data from social network 120 about social activity, such as user's friend's comments or ratings with respect to purchase data associated with user's social network 120 account.

As yet another example, an API that service provider 100 may interface with could serve to query a product information service 130 based on a standardized product data, such UPC, EPC, barcode, radio-frequency identification tag, and to receive a response in the form of descriptive product information, such as the name, image, description, availability, and price of a product.

As another example, an API that service provider 100 may interface with could serve to accept queries and deliver responses in the form of aggregated or streaming purchase information to a third party web service 140, as will be described more below. Such queries may contain information about the end-user, a specific product or category of products, or other keyword(s) and keyphrase(s).

Figure 3:
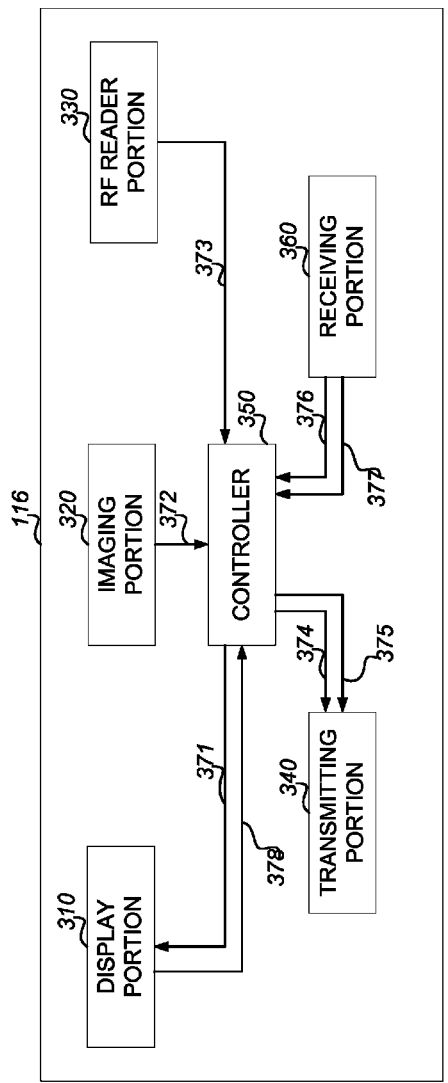
FIG. 3 is an exploded view of communication device 116 of FIG. 1.

FIG. 3 is an exploded view of communication device 116. As illustrated in the figure, communication device 116 includes a display portion 310, an imaging portion 320, a controller 350, a transmitting portion 340 and a receiving portion 360. In some embodiments, display portion 310, imaging portion 320, controller 350, transmitting portion 340, and receiving portion 360 are distinct elements. In some embodiments, at least one of display portion 310, imaging portion 320, controller 350, transmitting portion 340, and receiving portion 360 are a unitary element.

Imaging portion 320 is operable to obtain images, such as for example still images and video, and generate imaging data 372 based on the obtained images. As described in more detail below, the imaging data 372 that imaging portion 320 is operable to obtain is sufficiently detailed for the subsequent automatic deciphering of imaged barcode data via a computer program.

RF reader portion 330 is operable to read an RFID tag associated with a product purchased by user 112 and generate RFID data 373, as described in more detail below.

Display portion 310 is operable to display images, text, and user-input fields and to receive input from user 112, including haptic input. As described in more detail below, the images that display portion 310 is operable to display data which may include still images of at least one product and one or more user-input fields and to allow for the control of user interface via user's 112 touch, voice, or other input.

Transmitting portion 340 is operable to transmit data in order to communicate with network 160. For example, in cases where communication device 116 is a cell phone and where network 160 is a cell phone network, communication device 116 may transmit data to service provider 100 via network 160. In cases where communication device 116 is a wireless communication device, such as for example a Wi-Fi device, communication device 116 may directly transmit data to service provider 100. The data that transmitting portion 340 is operable to transmit includes service provider request data 374 and communication device request data 375, as will be described in more detail below.

Receiving portion 360 is operable to receive data from network 160 or directly with service provider 100. For example, in cases where communication device 116 is a cell phone and where network 160 is a cell phone network, communication device 116 may receive data from service provider 100 via network 160. In cases where communication device 116 is a wireless communication device, such as for example a Wi-Fi device, communication device 116 may directly receive data service provider 100. The data that receiving portion 360 is operable to receive includes service provider data 376 and communication device data 377, as will be described in more detail below.

Controller 350 is operable to process data received by receiving portion 360, to process imaging data 372 from imaging portion 320, to provide display data 371 to display portion 310, to process user input data 378 from display portion 320, to process RFID tag data 373 from RF reader portion 330, and to provide data to transmitting portion 340 for transmission. In some embodiments, mobile device 116 contains a GPS or assisted GPS portion that provides the location of client device in terms of latitude/longitude coordinates and is operable to transmit and have controller 350 process such location data. In other embodiments, mobile device 116 contains a cell phone locator portion that provides the location in terms of distance to the nearest fixed cell transmitter location or a group of transmitters and is operable to transmit and have controller 350 process such location data.

FIGS. 4A-E illustrate one embodiment of a sequence of user interfaces on mobile device 116 operated by user 112 to gather purchase data and communicate with service provider 100. It should be understood that the labels and placement of interface elements are representative only and that the importance is on their underlying functions. Likewise, it should be understood that any buttons can be physically moveable switches, softkeys, proximity switches, voice detectors, motion sensors, etc. operable to perform a function in response to user's desires.

In FIG. 4A, the user 112 engages with login element 411 causing the input of a username in the box below the word "Username" and a password in the box below the word "Password." Subsequently, user causes the "SUBMIT" button to be activated upon which user-entered username and password are transmitted to service provider 100 to create a new user account with service provider 100 or to authenticate against an existing user account on service provider 100. Should the service provider 100 successfully create or authenticate user, the user may proceed to the next user interface.

In FIG. 4B, the user 112 engages with the social network element 421 by causing buttons "Add Facebook", "Add Twiter", "Add Foursquare", or "Add Google Buzz" to be activated. Each of these four buttons corresponds to a particular social network 120. It should be understood that other social networks 120 may be integrated, and the illustrated social networks are for purposes of example only and are not intended to limit the disclosure. The result of such button activation is the association of user's 112 account with service provider 100 to the user's 112 account on the social network 120 corresponding to the button activated. Such association also gives service provider 100 authorization to interface with the associated social network 120 on user's 112 behalf. Should the user 112 successfully complete one or more such associations, the user 112 may proceed to the next user interface by causing the "CONTINUE" button 422 to be activated.

In FIG. 4C, imaging portion 320 is disposed on the side of communication device 116 that is opposite to the side having display portion 310. Accordingly, when communication device 116 is oriented such that imaging portion 320 is facing a product, user 112 may view an image of product on display portion 310. As illustrated, the user 112 engages with an identification element 431 by placing the barcode of a product the user's purchased so that imaging portion 320 can focus on the barcode and display portion 310 can show an image of barcode. Should controller 350 successfully decode such image data into numerical data (as shown, into the digits "1234567890128"), such numerical data is transmitted to service provider 100 and a response from service provider 100 is accepted with descriptive product information regarding the purchase. If this is successfully completed, the user 112 may proceed to the next user interface. It should be noted that the location and orientation of the display portion 310 and the imaging portion 320 is not intended to be limited in this disclosure by this example embodiment and may be placed in any number of functional locations and orientations.

In FIG. 4D, the user 112 is presented with three interface elements. Descriptive element 442 displays the descriptive product information relating to the product scanned in FIG. 4C. As shown, the barcode "0123456789" correlates to a product named "Nike Air Jordan Shoe" with a description "This shoe was designed by the champ himself. Comes in red and white colors" and with the image depicted within descriptive element 442. In socialization element 443, user 112 can cause buttons representing social networks 120 ("Facebook", "Foursquare", "Twitter", and "Google Buzz") to be activated, upon which the user's 112 purchase information is transmitted to service provider 100 and associated with the social network 120 corresponding to the button activated. As part of this process, user 112 may be allowed to personalize the information being associated with user's 112 social network 120 account. Personalization that may be supported may include text, such as user's 112 comment about the purchase, or any combination of text and multimedia. It should be understood that other social networks 120 may be integrated, and the example social networks are included in the depicted embodiment for the purpose of illustration only. Restart element 441 is used to return the user to the previous user interface illustrated in FIG. 4C.

Figure 4E:
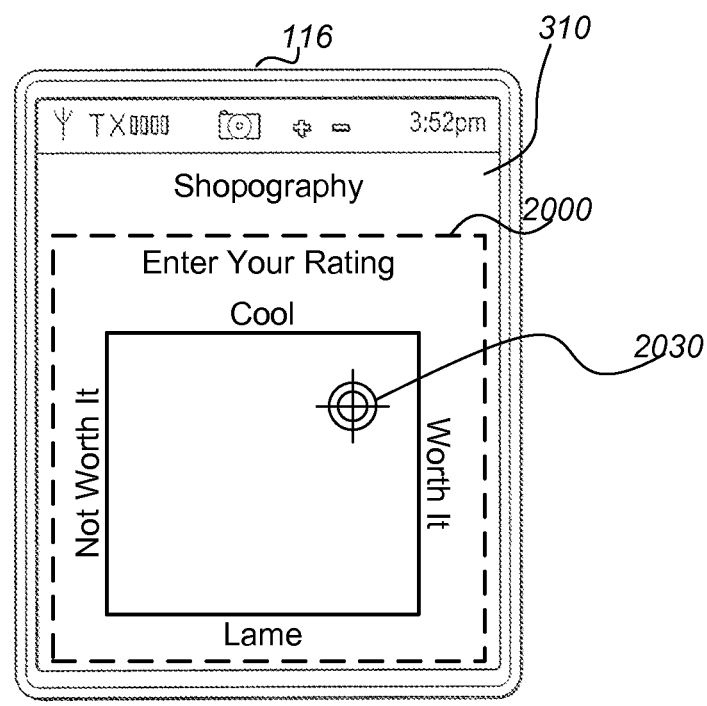

In FIG. 4E, the user 112 is presented with the graphical user interface (GUI) 2000 or rating element for inputting a rating pertaining to the product that was scanned in FIG. 4C. As shown, the user has moved the target 2030 from a centered position to a position reflecting that the product and/or purchase was somewhat "cool" and somewhat "worth it." Such rating is transmitted to service provider 100 and associated with user's 112 account.

Figure 5:
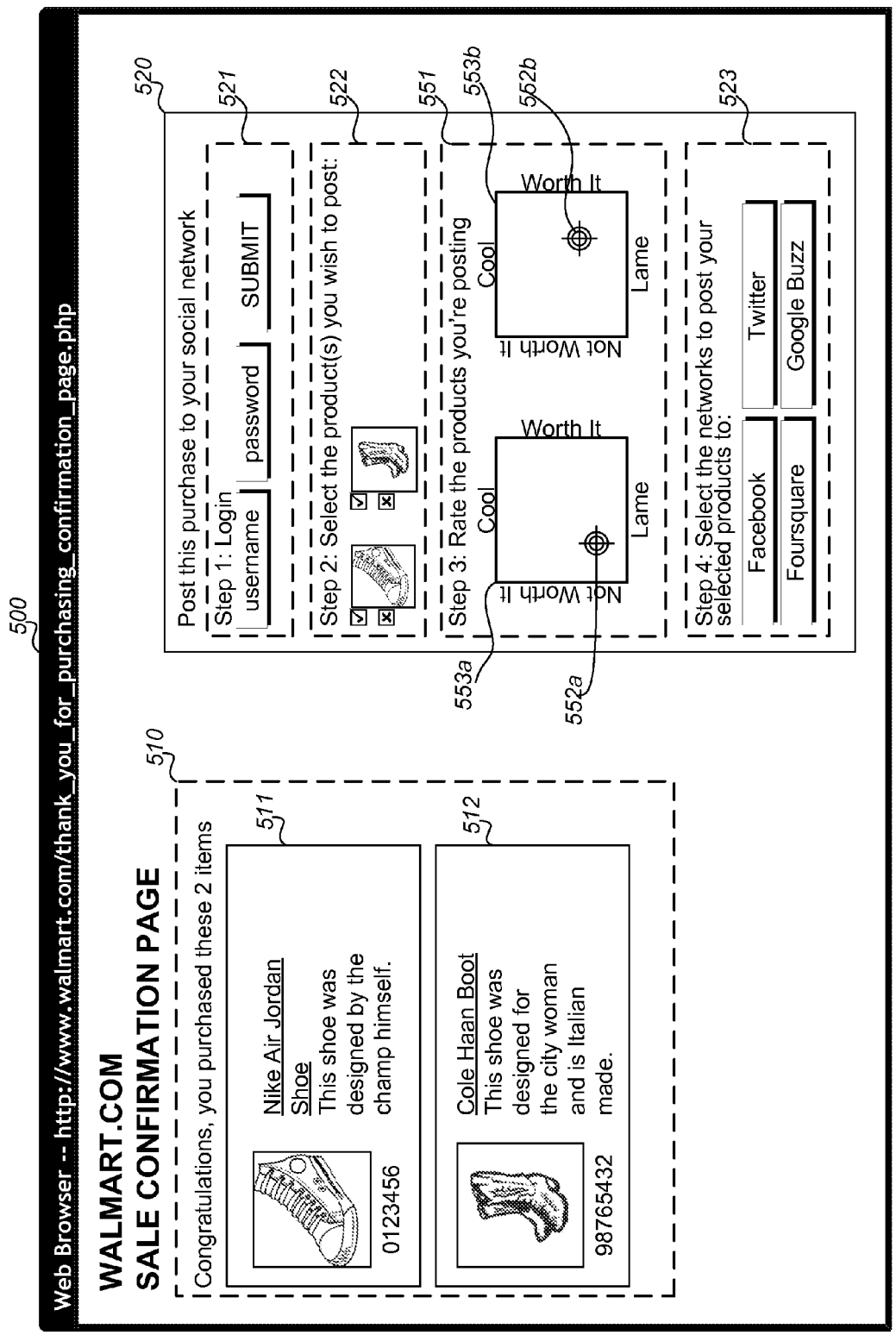
FIG. 5 illustrates one embodiment of a web-enabled input device in which the user 111 authenticates with the service provider, selects products user has purchased, rates a product purchase 2000, and posts purchase information to a social network 120.

FIG. 5 illustrates one embodiment of a web-enabled input device 520 presented on retailer's 150 website in which the user 111 authenticates with the service provider 100, selects products user 111 has purchased and wishes to associate with a social network 120, rates selected products, and then causes the association of such purchase information with one or more of user's 111 desired social network 120 accounts and with user's 111 service provider 100 account. It should be noted that interface 520 may also be engaged with on computer 115 by user 111.

Interface 500 is a generated by retailer's 150 shopping cart system as the confirmation and receipt portion of the checkout process. In the illustrated embodiment, interface element 510 depicts the product(s) the user 111 has purchased. Here, the user has purchased a "Nike Air Jordan Shoe" as depicted in element 511 and a "Cole Haan Boot" as depicted in element 512.

User interface 520 serves to engage the user 111 with service provider 100. User 111 engages with a first step 521 of interface 520 by causing the input of user's 111 service provider 100 username in the box within which the word "username" is displayed and by causing the input of user's 111 service provider 100 password in the box within which the word "password" is displayed. Subsequently, user 111 causes the "SUBMIT" button to be activated upon which the user-entered username and password are transmitted to service provider 100 to create a new user account with service provider 100 or to authenticate against an existing user account on service provider 100.

User 111 then engages with a second step 522 of interface 520 by causing the selection or deselection of product(s) user 111 has purchased from retailer 150. In so doing, the user 111 is defining which product(s) the user 111 wishes to have associated with user's 111 social network 120 account(s) and with user's account on service provider 100.

User 111 then engages a rating element as a third step 551 in order to input ratings pertaining to the products that were purchased. As shown, the user has moved targets 552a,b pertaining to the "Nike Air Jordan Shoe" and "Cole Haan Boot" from a centered position to a position reflecting a desirability rating and value rating of the products, each product rating reflected on a rating matrix 553a,b which includes scales ranging between "lame" and "cool" for desirability and between "not worth it" and "worth it" for value. Such rating system is similar in application to the rating systems, rating element, and GUI 2000 of FIG. 4E and FIG. 20. Such rating is transmitted to service provider 100.

User 111 then engages with the fourth step 523 of interface 520 by causing buttons representing social networks 120 (in this embodiment, "Facebook", "Twitter", "Foursquare", "Google Buzz") to be activated in accordance with the user's 111 desire to associate purchase information with the user's 111 social network 120 account represented by activated button. As part of this process, user 111 may be allowed to personalize the information being associated with user's 111 social network 120 account. Personalization that may be supported may include text, such as a user's 111 comment about the purchase, or any combination of text and multimedia. As part of the personalization, merchants may also provide images, text descriptions, or any combination of text and multimedia. If service provider 100 does not have information or authorization with respect to the user 111 and the user's 111 social network 120 account represented by activated button, then interface 520 may cause such information and authorization to be requested and transmitted to service provider 100. It should be understood that other social networks 120 may be integrated and illustrated social networks are for the purposes of illustration of one example embodiment only.

Figure 6:
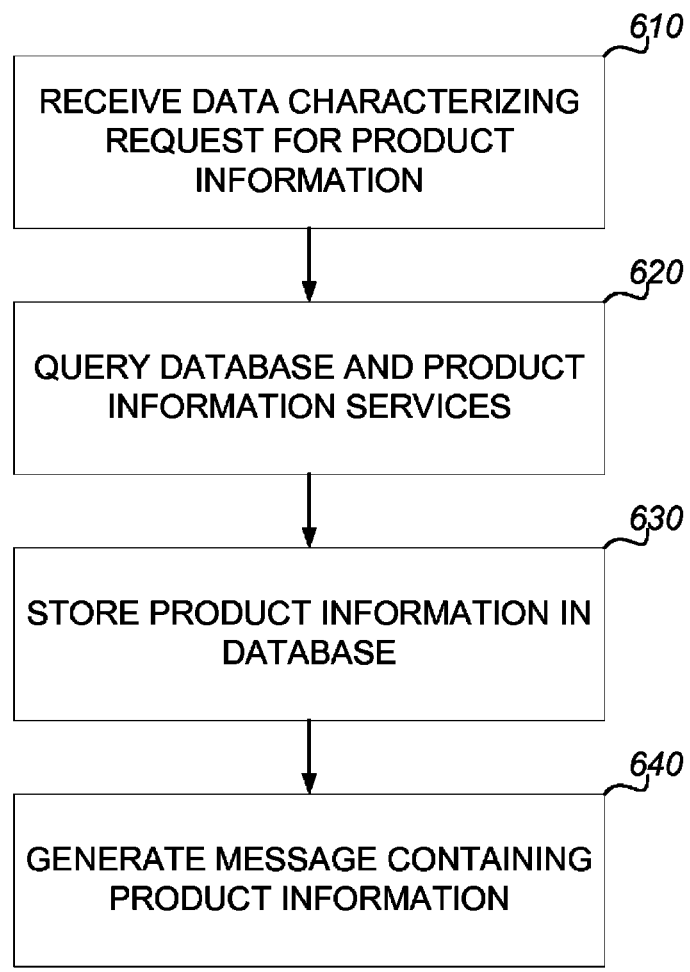
FIG. 6 is a diagram illustrating the main steps to retrieve, store, and transmit descriptive product information based on a standardized product data query such as a barcode.

FIG. 6 is a diagram illustrating the main steps used by service provider 100 to handle incoming requests for descriptive product data. In general, the process includes receiving data characterizing a request for descriptive product information 610, querying database 202 and product information service 130 for such descriptive information 620, cataloging any newly discovered product information 630, and generating a response to the request that contains the requested descriptive information 640.

Figure 7:
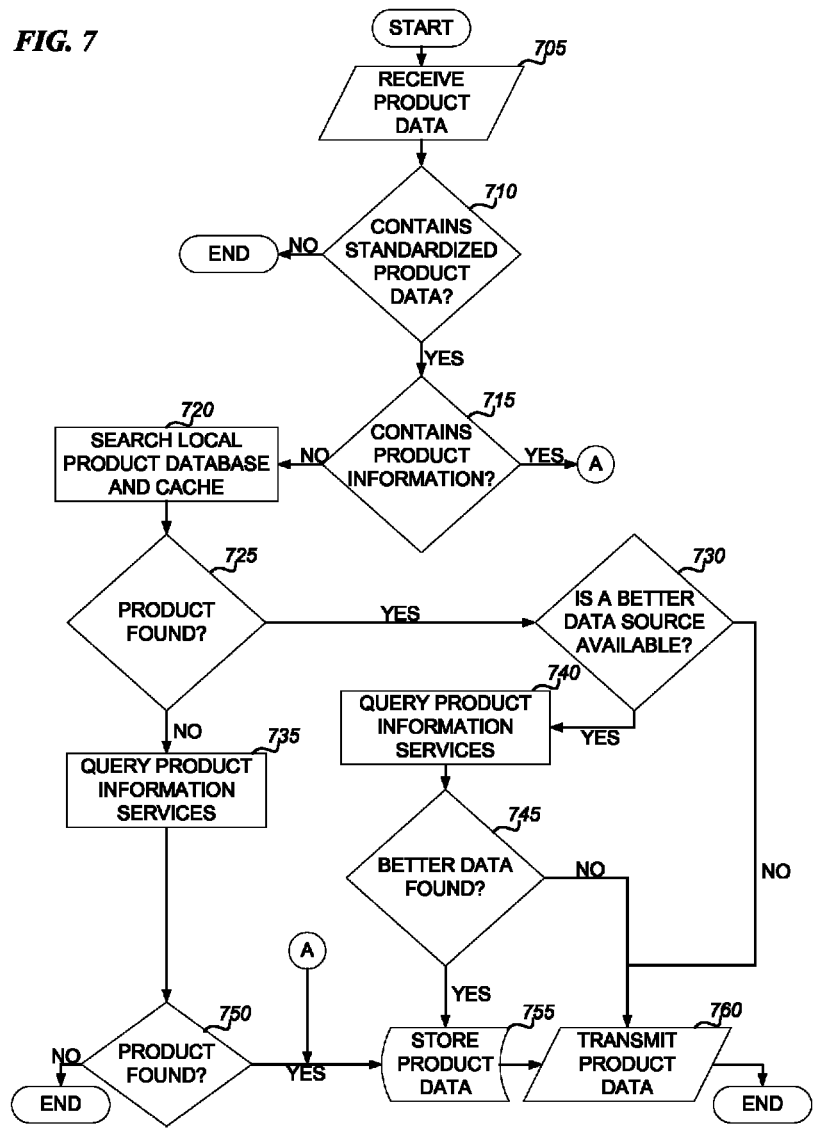
FIG. 7 is a flow diagram illustrating an example method of operating service provider 100 to accept product data, retrieve description product information, store data, and transmit product information.

FIG. 7 is an exploded flow diagram of the process of service provider 100 illustrated in FIG. 6. In step 705, service provider 100 receives a transmission of data characterizing a request for descriptive product information. In step 710, it is determined whether such data contains standardized product data such as a UPC code, RFID, QR code, or other standardized product data. If not, the process terminates. If so, it is then determined whether such data already contains descriptive product information 715. If this is also true, the process jumps to step 755 whereby the standardized product data and descriptive product information are stored in database 202. The process then finalizes with the response transmission of standardized product data and descriptive product information. However, if step 715 is not true, then the process continues to step 720 in which database 202 is searched for descriptive product information correlating to the standardized product data received in step 705. It is then determined in step 725 whether descriptive product information was found in database 202. If it is not found, then the process continues to step 735 wherein the service provider 100 contacts the best available product information service 130 with a query for descriptive product information pertaining to data received in step 705. If a plurality of product information services exists, this step will involve querying them in a manner resulting in the best and most accurate information. If descriptive product information is not found, then the step 750 terminates the process since no descriptive product information can be obtained regarding the standardized product data. If information is found, step 750 continues to step 755 wherein the standardized product data and descriptive product information discovered in step 735 are stored in database 202. The process then finalizes with the response transmission of the standardized product data and descriptive product information discovered in step 735. However, returning to step 725, if descriptive product information was found as a result of step 720, it is then determined in step 730 whether the original source of such descriptive product information is potentially inferior to newly discoverable information. If not then the process finalizes with the response transmission of the standardized product data and descriptive product information discovered in step 720. If so, then the process continues to step 740 wherein the service provider 100 contacts the best available product information service 130 with a query for descriptive product information pertaining to data received in step 705. If a plurality of product information services exists, this step will involve querying them in a manner resulting in the best and most accurate information or until it is determined that the descriptive product information from step 730 will be more accurate that any subsequently obtainable information. It is then determined whether better or more accurate descriptive product information was found in step 745. If so, the process continues to step 755 whereby the standardized product data and descriptive product information discovered in step 740 are stored in database 202. The process then finalizes in step 760 with the response transmission of the standardized product data and descriptive product information discovered in step 740. Returning to step 745, if better information was not found, then the process finalizes with the response transmission of the standardized product data and descriptive product information discovered in step 720.

Figure 8:
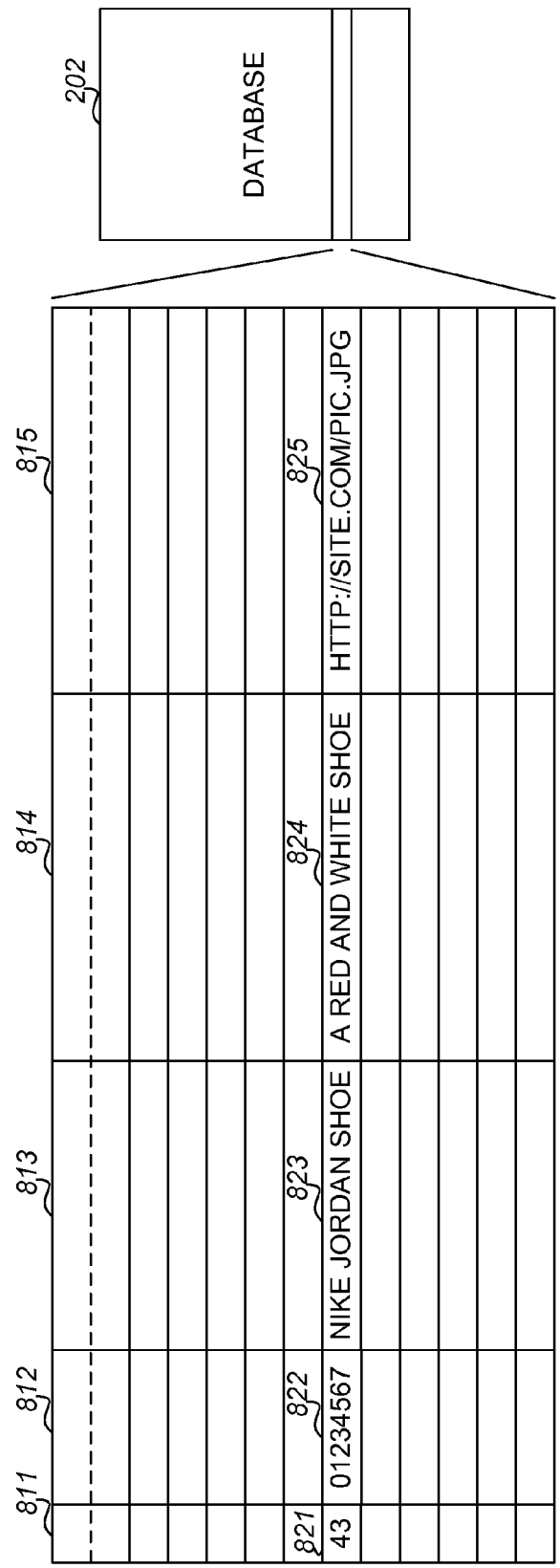
FIG. 8 illustrates an example of a relational data model of product information.

FIG. 8 illustrates an example of a relational data model of product information. Database 202 stores product information. This information includes a product's identifier 811, barcode identifier 812, name 813, description 814, and image location information 815. Database 202 can also store other information, such as a product's UPC identifier, a product's EPC identifier, a product's RFID tag identifier, a product's QR code, information about the year and country in which the product was manufactured, make and model of the product, the designer(s) involved in producing the product, information on the original source of all such data, a data accuracy rating, a timestamp recording when an entry was entered or last updated, and product-related advertisement(s) or coupon (s), among others. The database 202 can also store graphic information related to each product, such as multiple pictures of a product or any other product-associated images. The database 202 can also store other data objects, such as video clips, audio clips, hypertext links, documents, or other data provided by or associated with the product.

Figure 9:
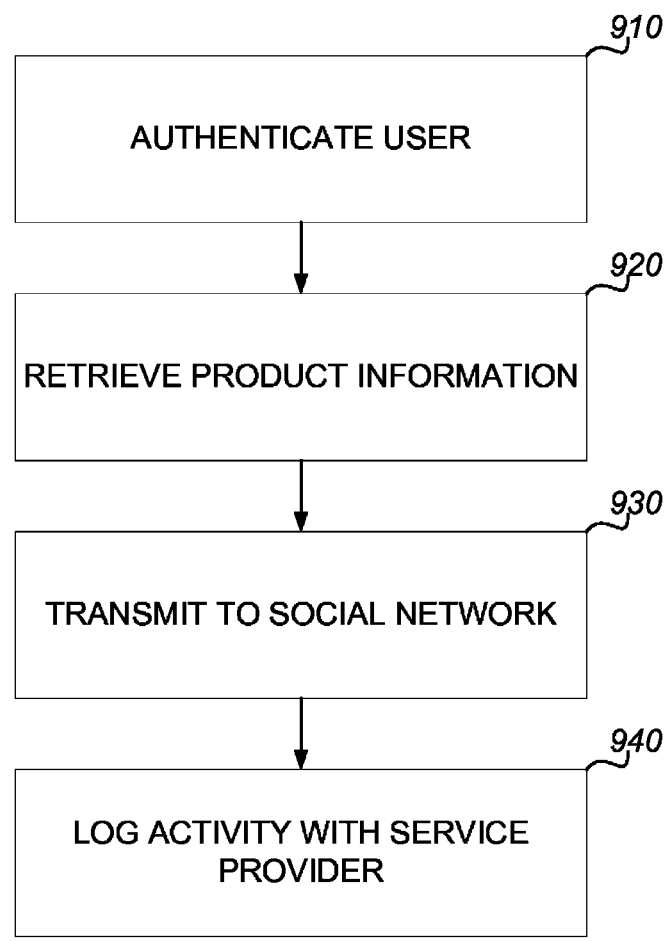
FIG. 9 is a diagram illustrating the main steps to transmit purchase information to service provider 100 and post to a social network 120.

FIG. 9 is a diagram illustrating the main steps of a user interface to authenticate user 111,112,113 with service provider 100, to ascertain user's purchase information, to associate purchase information with a user's account on a social network 120, and to transmit and store purchase information with service provider 100. In general, the process 910 begins with receiving an authentication request that includes user's 111 and 112 username and password or user's 113 card 117 information. The process 910 can double as a new user registration request if it is determined that user 111,112,113 has no account with service provider 100. In the case such process involves a card 117, registration may involve service provider 100 generating an email to user 113. The process continues with step 920 which serves to ascertain product(s) the user has purchased. The process then continues with step 930 which causes user-desired purchase information to be associated with user's social network account. The process finalizes with step 940 which associates the purchase data with the user's service provider 100 account.

FIG. 10 is an exploded flow diagram of the user interface process illustrated in FIG. 9. Upon authentication 1010 of user 111,112,113, it is determined in step 1020 whether the interface is prepopulated with standardized product data, such as a UPC. If so, it is then determined in step 1025 whether the interface is prepopulated with sufficient descriptive product information. If so, then the standardized product data and descriptive product information are transmitted to service provider in step 1035, initiating with service provider 100 a process illustrated in FIG. 6. The user interface then proceeds with step 1055, which will be described in more detail below. If it is determined in step 1025 that interface is not prepopulated with sufficient descriptive product information, then the standardized product data is transmitted to service provider 100 in accordance with step 1040.

Returning to step 1020, if the user interface is not prepopulated with standardized product data then user interface proceeds with an initiation of a scan in step 1015. This scan may include, but is not limited to, a method of imaging and decoding product's physical barcode label or a method of reading a product's RFID tag information. It is then determined in step 1030 whether such scan produced usable data in the form of standardized product data. If not, then the process continues with step 1070 in which the user 111,112, or 113 is provided with methods of manual data input. If so, then the process continues with step 1040 in which the standardized product data is transmitted to service provider 100 causing the process illustrated in FIG. 6 to be initiated. The process continues with step 1045 in which the user interface receives a response from service provider 100 containing requested descriptive product information.

If it is determined that such response does not contain such information, then the user interface proceeds to step 1070 in which user 111,112, or 113 is asked whether user 111,112, or 113 wishes to perform a keyword search for the product user 111,112, or 113 has purchased. If user 111,112, or 113 responds in the affirmative, then the user interface proceeds to step 1075, which provides a mechanism for user 111,112, or 113 to input keyword(s) of keyphrase(s). Upon submission, user input is transmitted to service provider 100 causing the process illustrated in FIG. 6 to be initiated, and the user interface proceeds to step 1045, as described above. If user 111,112, or 113 responds in the negative to a keyword search, then user interface proceeds to step 1085 in which user 111, 112, or 113 is provided a mechanism to input manually all descriptive product information, such as a product name, description, image, and other fields consistent with database 202. Upon completion, such user input is transmitted to service provider 100 causing the process illustrated in FIG. 6 to be initiated, and the user interface proceeds to step 1055.

By the time the user interface reaches step 1055, the user interface has sufficient information about a user's 111,112, 113 identity and purchase to proceed with the association of purchase information to user's 111,112,113 desired social network 120 accounts and to user's 111,112,113 service provider 100 account. In step 1055, user interface displays descriptive product information serving to make user 111, 112,113 aware of the purchase information user 111,112,113 is considering associating with user's 111,112,113 accounts. The user interface then proceeds to step 1060 in which user 111,112,113 is provided with a mechanism to select products user 111,112,113 wishes to have associated with user's 111, 112,113 desired social network 120 and service provider 100 accounts. The user 111,112,113 is then prompted to confirm such association in step 1065. If the user 111,112,113 denies association, the process ends. If the user 111,112,113 confirms the association, the user interface causes user's 111, 112,113 purchase information to be associated with user's 111,112,113 desired social network 120 accounts. The process then proceeds to transmit user's 111,112,113 purchase information to service provider 100 for cataloguing. Finally, the user interface prompts the user 111,112,113 whether user 111,112,113 wishes to repeat the process. If so, the user interface proceeds to step 1020.

FIG. 11 illustrates an example of a relational data model of user information. Database 202 stores user 111,112,113 information. This information includes basic information, such as the user's 111,112,113 identifier 1110, social network 120 identifier 1111, name 1112, gender 1113, age 1114, domicile 1115, and a list of identifiers of user's 111,112,113 friends 1116 on social network 120. Database 202 can also store other information, such as user identifiers and friend lists from a plurality of social networks 120, what type of people the user 111,112,113 is interested in meeting or dating, what types of food or events the user 111,112,113 prefers, and any other information that may assist service provider 100 in delivering the most relevant information to third party web service 140. The database 202 can also store graphic information related to each user 111,112,113, such as the user's 111,112,113 picture and any other associated images. The database 202 can also store other data objects, such as video clips, audio clips, hypertext links, documents, or other data provided by or associated with the user 111,112, 113.

FIG. 12 illustrates an example of a relational data model of purchase information. Database 202 stores purchase information as submitted by user 111,112,113. This information includes basic information, such as the purchase's identifier 1210, the identifier 1110 associated with the purchase 1211, the product identifier 811 associated with the purchase 1212, the latitude and longitude coordinates of the purchase 1213, the time the purchase was made 1214, the user-inputted desirability of the product and/or purchase 1215, and the user-inputted value of the product and or purchase 1216. Database 202 can also store other information, such as at which retailer 150 the purchase was made, the address to which the purchase was shipped or billed, and the URL from which the user 111,112,113 submitted purchase information. The database 202 can also store graphic information related to each purchase, such as a photo of user 111,112,113 modeling the purchased product, and any other associated images. The database 202 can also store other data objects, such as video clips, audio clips, hypertext links, documents, or other data provided by or associated with the purchase.

Figure 13:
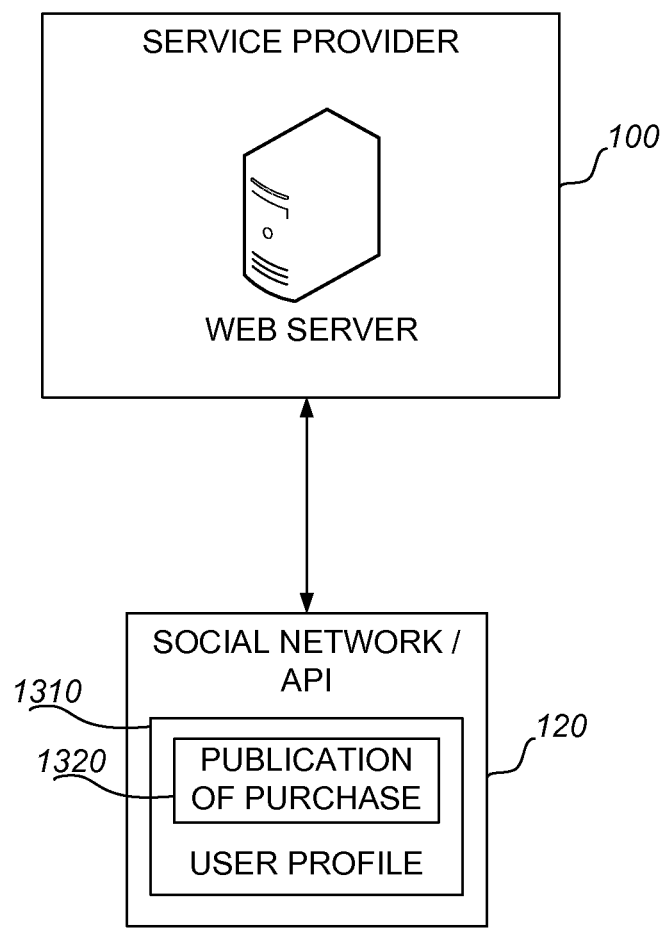
FIG. 13 is a diagram illustrating the publication of a purchase to a user's 111,112,113 social network profile.

FIG. 13 is a diagram illustrating the transmission 930, 1080 and association of purchase information to a user's 111,112, 113 social network 120 account. In this embodiment, user's 111,112,113 social network 120 is associated with user's service provider 100 and user 111,112,113 has caused the transmission of purchase information in accordance with step 930 of FIG. 9 and step 1080 of FIG. 10. Here, the user's 111,112,113 social profile account is displayed via a user interface 1310 provided by social network 120 and may be accessed via other users of social network via a web browser or other device. In this embodiment, the user interface displays a publication 1320 of user's purchase information as associated by means of service provider 100.

Figure 14:
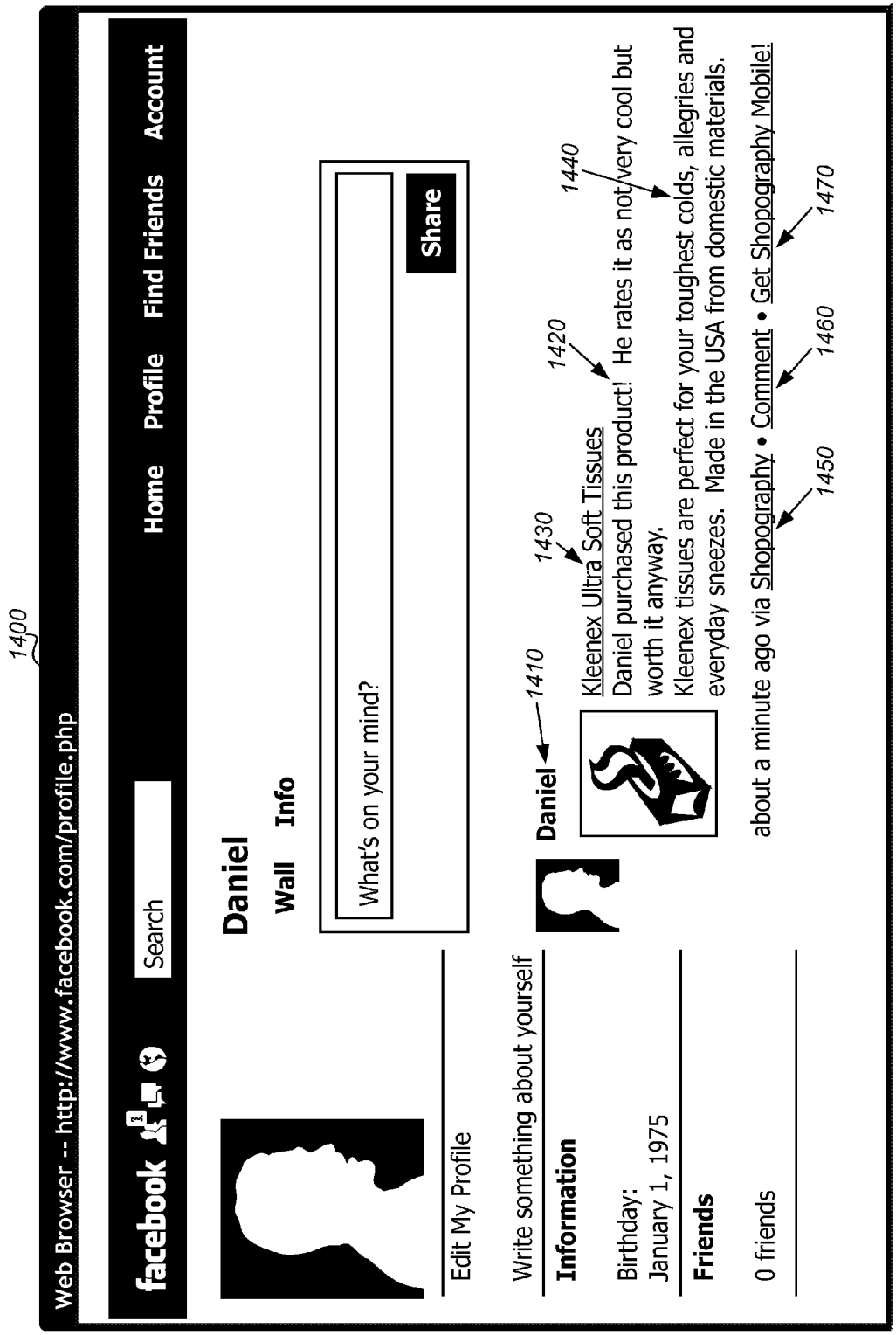
FIG. 14 is a diagram illustrating a user interface of a social network 120 to display purchase information.

FIG. 14 is a diagram illustrating an exemplary web-based user interface 1400 of a social network 120 that displays a publication of user's 111,112,113 purchase information as associated by means of service provider 100. In this embodiment, social network 120 is FACEBOOK and user's name is "Daniel." Name element 1410 displays the name of the profile's owner. Text element 1430 contains text and link information detailing the name of the product the user 111,112, 113 has purchased and associated with social network 120 by means of service provider 100. Such link information can be a source of revenue as retailers, merchants, and manufacturers could pay, bid, or otherwise cause to have such links directed to their stores or product-promoting webpages. In the alternative, such link can be directed to a web-based user interface of service provider 100 that provides more detailed information about the product, as will be described in FIG. 19. Description element 1420 displays information describing the nature of the publication in a general sense. In an alternative, it could also contain descriptive information regarding the retailer 150 from which the product was purchased. Summary element 1440 displays a descriptive summary regarding the user's 111,112,113 purchase. SP element 1450 is a text and link information describing the service provider 100. Comment element 1460 allows viewers of user's 111,112,113 social network 120 profile to comment and engage in conversation about user's 111,112,113 purchase. Get element 1470 contains text and link information providing all viewers of user's profile with information on how to engage with service provider 100. In the alternative, get element 1470 could contain revenue-generating text and link information as retailers, merchants and manufacturers could pay, bid, or otherwise cause to have such links directed to their stores or product-promoting webpages. Other elements not depicted or called-out may also be included in such publication, such as longitude and latitude data, map data, photos and links to related products, videos of the products, links to the manufacturer's website, links to special product-related promotions or coupons, and aggregate data relating to published product as generated by service provider 100.

Figure 15:
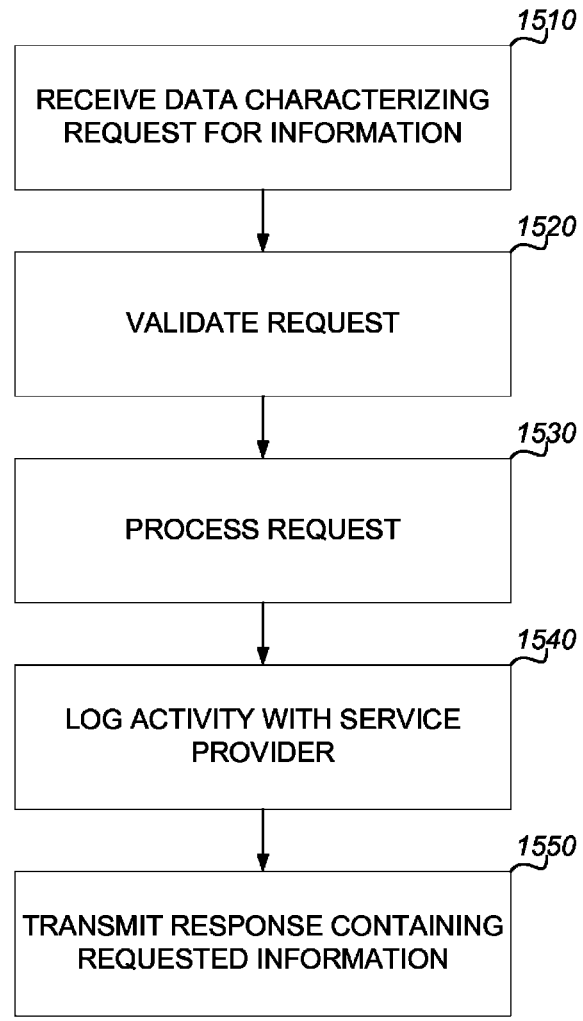
FIG. 15 is a diagram illustrating the main steps to retrieve aggregated data from service provider 100.

FIG. 15 is a diagram illustrating the main steps by which a third party web service 140 can retrieve aggregated or streaming data from service provider 100 from database 202. In general, the process begins with the service provider 100 receiving data from third party web service 140 that characterizes a request for a particular set of information 1510. The request is then validated and authorized 1520. The service provider 100 then processes the request and prepares data constituting a valid response to the request 1530. The service provider logs such request 1540 and then causes the response to be transmitted to the requester 140.

Figure 16:
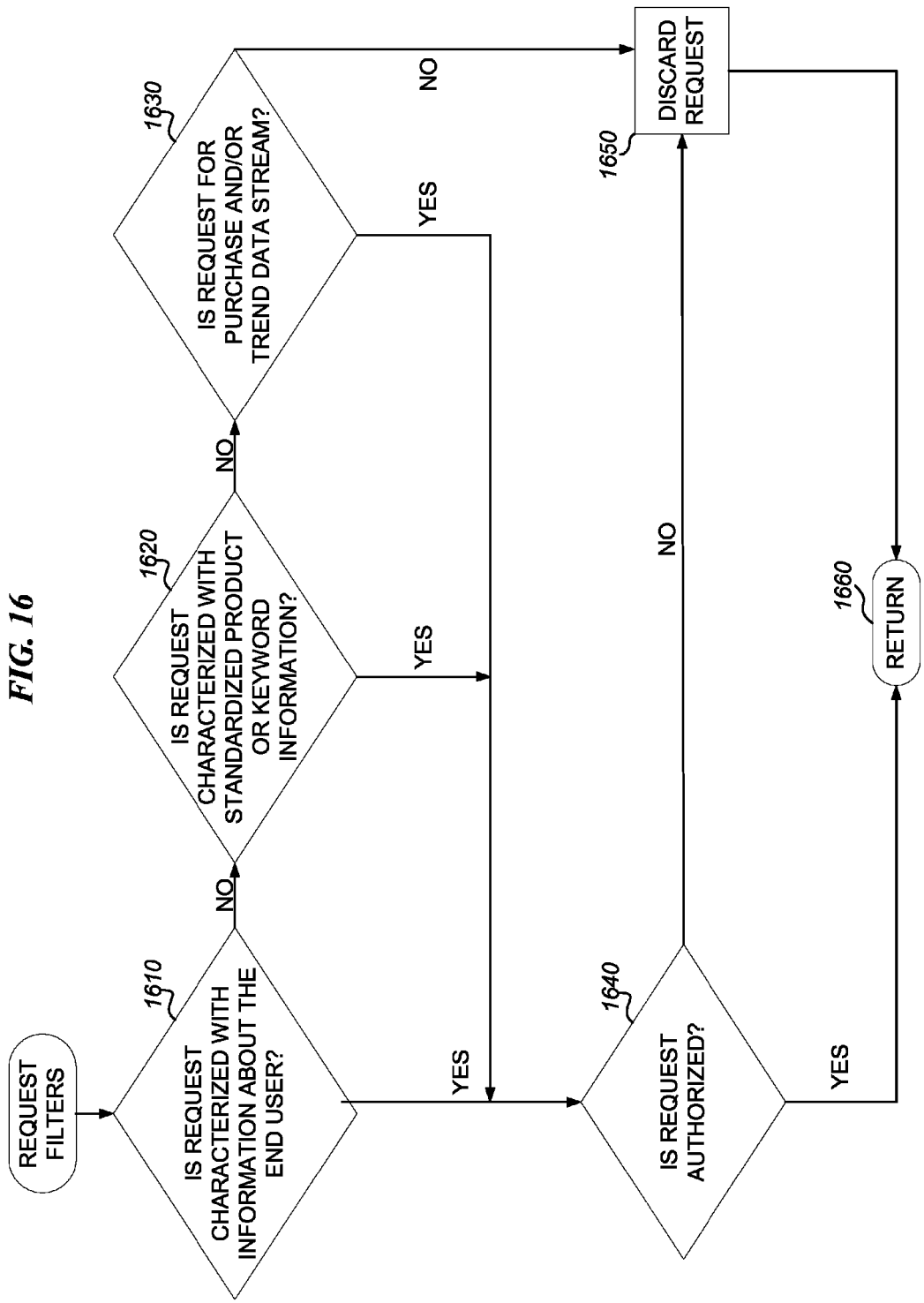
FIG. 16 is a flowchart of an exemplary method to filter incoming requests for aggregated data.

FIG. 16 is a flowchart of an exemplary method to filter incoming requests for aggregated or streaming data as part of step 1520 of FIG. 15. In general, the process serves to discard requests that do not contain the requisite minimum amount of data. The process starts by determining whether the request contains information about the end-user of third party web service 1610. Such information can be used to tailor a response transmission to better suit the end-user. If no such information about the end-user exists in the request, the process continues by determining whether the request contains any standardized product information, such as UPC, or whether the request contains keyword information, such as a product category and particular location 1620. Such information can be used to tailor the response transmission to include only relevant data. If no such information is provided, the process continues by determining whether the request is a general request for a purchase stream or for aggregated purchase trend data 1630. If steps 1610, 1620, and 1630 all result in the negative, then the request is discarded 1650. If any of steps 1610, 1620, and 1630 result in the affirmative, then it is determined whether the entity requesting such information is authorized to receive a response transmission. If not, then the request is discarded 1650. If so, then a response transmission is ready to be prepared by service provider 100.

Figure 17:
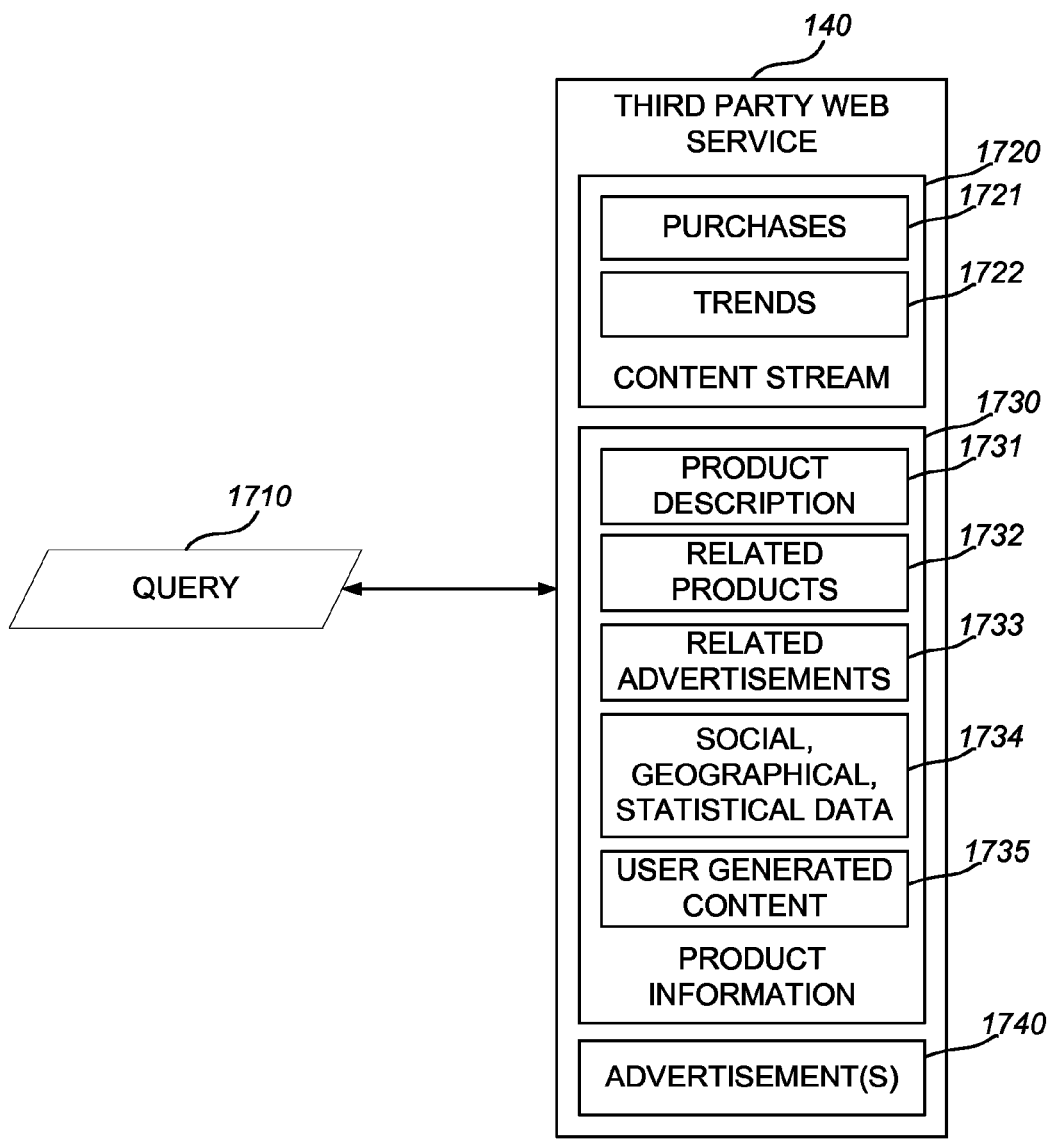
FIG. 17 is a diagram illustrating exemplary responses to queries for aggregated data.

FIG. 17 is a diagram illustrating exemplary responses to queries for aggregated or streaming data as transmitted according to step 1550 of FIG. 15. A query can result in the transmission of a content stream 1720. Such stream can contain data regarding purchases 1721 and/or trends 1722 in the marketplace. Such stream can be filtered to suit the needs of the party requesting such information, such as a third party web service 140, by providing, for example, keyword data, standardized product information, or information about the end-user. Such stream may contain data about the location or purchases, data describing the products that are being purchased, the characteristics of the user's making such purchases, and any combination thereof. Furthermore, it can contain aggregated trend data such as information as to which products are most popular in a given area, which demographics are most likely to buy a certain product or category of products, and any combination thereof. Retailers, merchants, and manufacturers may pay, bid, or otherwise cause to have advertisements delivered alongside such data and can request their ads only be displayed under certain circumstances. For example, a manufacturer could request that its advertisements only be shown when its competitor's products are trending high.

A query can likewise result in the transmission of information regarding a specific product 1730. Such information can contain a product description 1731, such as a name and image; related products 1732 as determined by aggregating purchase and user information contained in database 202; related advertisements 1733 that can be paid for, bid on or otherwise acquired by means of a referral system; social, geographical, and statistical data 1734 as determined by aggregating purchase and user information contained in database 202; and user-generated content 1735, such as comments about a particular purchase, as retrieved from social network 120.

Finally, a query can result in the transmission of advertisement(s) or coupon(s) 1740. Such response can be tailored to the end-user of third-party web service 140 and advertisers may pay, bid or otherwise cause for advertisements to be delivered to targeted demographics defined by such factors as an end-user's aggregate purchase history, an end-user's age, an end-user's sex, an end-user's sexual preference, an end-user's types of friends, an end-user's friends' aggregate purchase histories, or any combination thereof.

Figure 18:
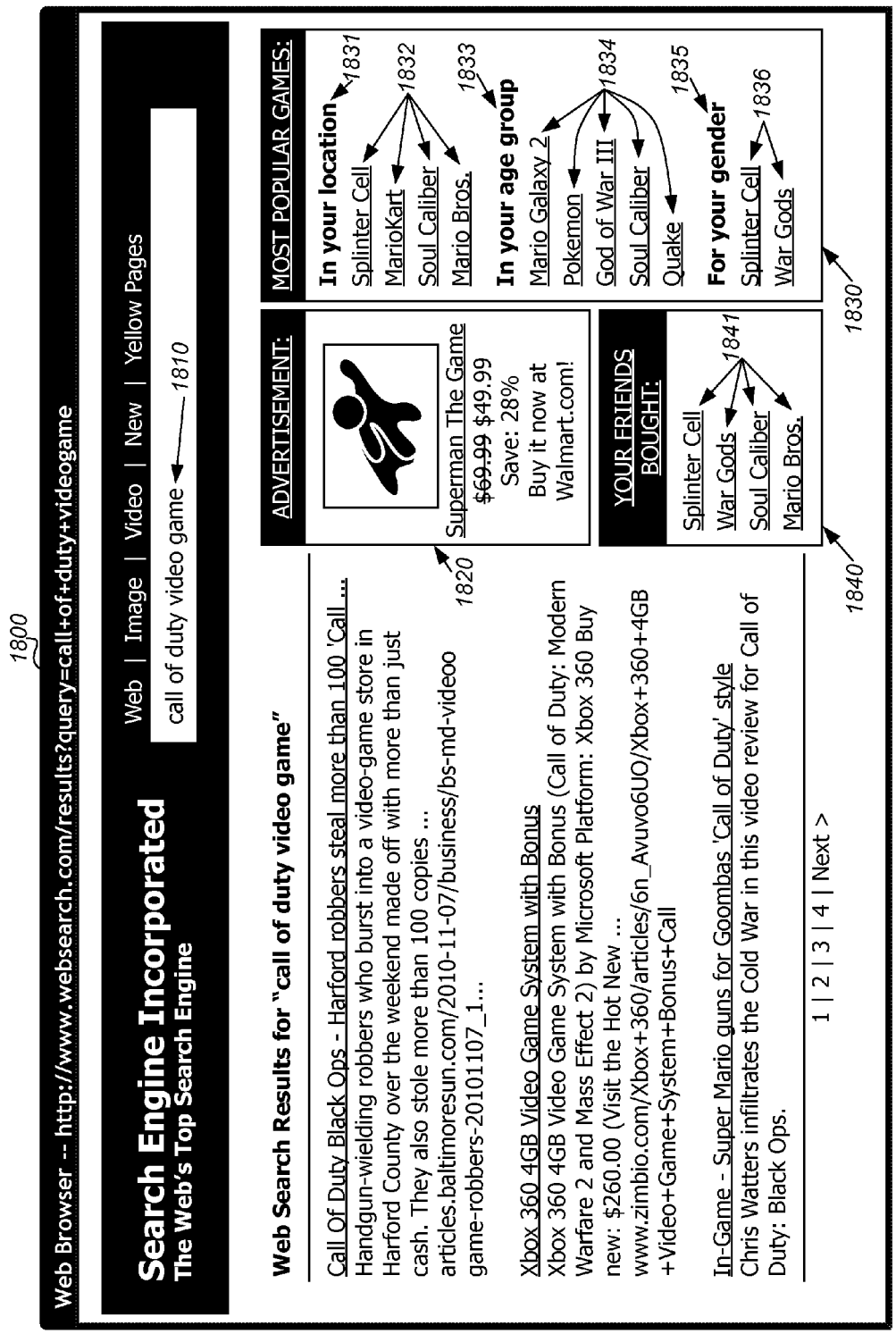
FIG. 18 illustrates an exemplary integration of aggregated data into a third party web service 140.

FIG. 18 illustrates an exemplary integration of aggregated data into a web-based user interface of a third party web service 140, herein embodied as a search engine's query result page 1800. Here, end-user has executed a search for "call of duty video game" 1810. Search engine can request from service provider 100 information regarding other popular video games 1830, relevant advertisements 1820, or information regarding end-user's friend's purchases in the category of "videogames" 1840. Response 1830 can be subdivided by a plurality of filters that can produce tailored data, such as that relating to end-user's location 1831, the end-user's age group of 1833, and the end-user's gender 1835, or any combination thereof. Examples of specific products in these subsets are depicted 1832, 1834, 1836, and 1841. Each product listed in such subsets can provide link information that can be bid on, paid for, or otherwise determined by means of a referral system.

Figure 19:
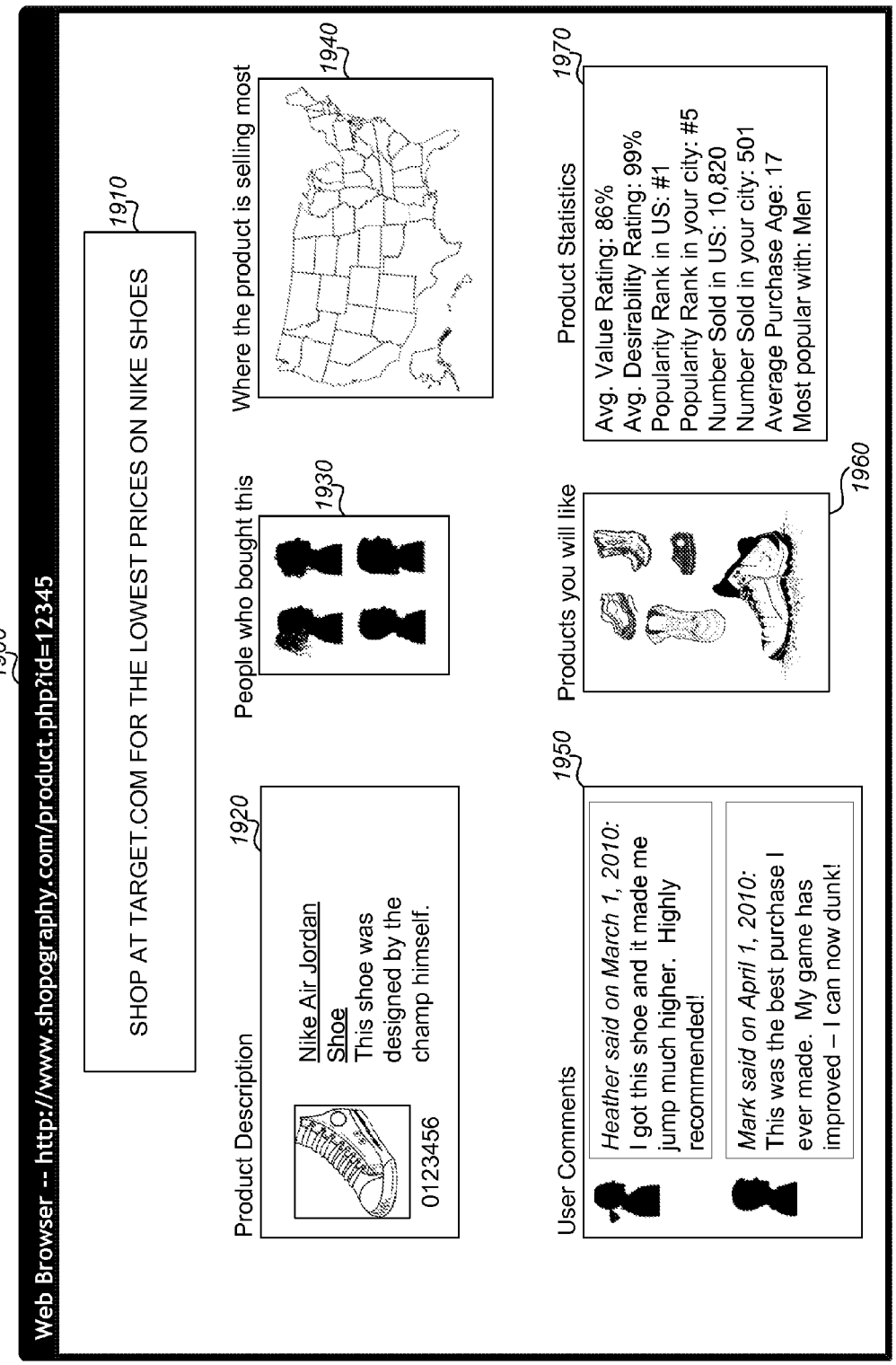
FIG. 19 illustrates an exemplary integration of aggregated data into a third party web service 140.

FIG. 19 illustrates an exemplary integration of aggregated data into a web-based user interface of a third party web service 140, herein embodied as a web page 1900 generated by service provider 100. Information depicted includes a target advertisement 1910 that can be bid on, paid for, or otherwise determined by means of a referral system. An embodiment of a referral system may behave in such a way that if an end-user reached the page 1900 via the link 1430 and the particular product described by the link 1430 was purchased and transmitted to service provider 100 via any particular retailer 150, such particular product retailer 150 may be afforded a priority in having its advertisements displayed in target advertisement 1910 with respect to the given product 1920 being viewed by end-user. Descriptive element 1920 displays descriptive information regarding a product being viewed by end-user. Such information may include an image, a video, a product name, a product description, the product's country of manufacturer, available sizes of product, product price, and information as to where such product can be purchased. Information element 1930 displays information about other users of service provider 100 who have either purchased this item or are stylistically, demographically, or otherwise determined to be relevant to end-user. Such list can be delivered in such a manner to emphasize those other users who are most like the end-user and can therefore ultimately best inform end-user of the relevant products. Map element 1940 provides map data with superimposed aggregate data from service provider 100 informing end-user of how and where the particular product being viewed is selling in various regions and to certain demographics. Content element 1950 displays user-generated content, embodied here as comments aggregated from social networks 120 pertaining to this particular product. Such content can be filtered to suit the end-user. As embodied here, image element 1960 displays images of other products that are likely to be purchased by end-user. Such products may be determined on aggregate information available to service provider 100 with or without respect to end-user and can be influenced by the paid for or bid upon desires of advertisers. Statistics element 1970 displays aggregated product statistics as determined by service provider 100 with respect the product being viewed by end-user. In the current embodiment, statistics element 1970 displays the statistical popularity of the product in relation to geographical location.

Figure 20:
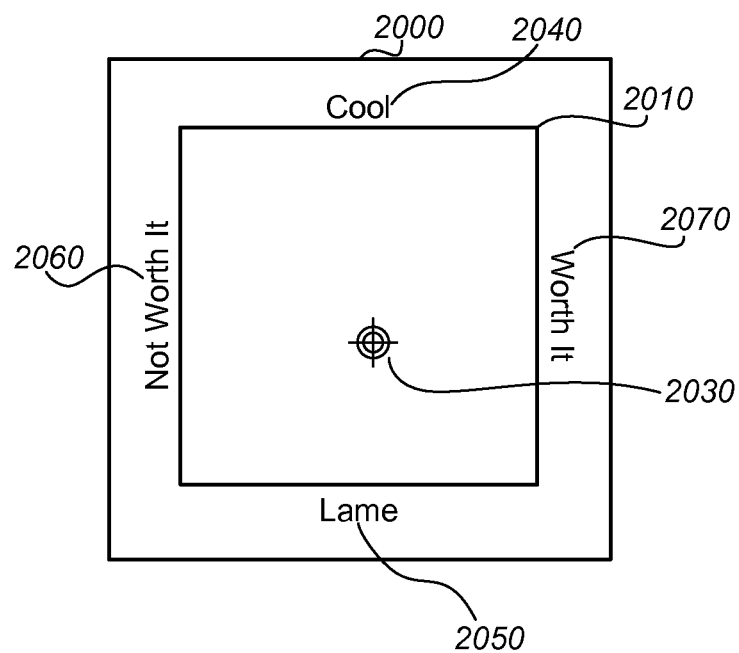
FIG. 20 illustrates an exemplary graphical user interface for inputting a product rating.

FIG. 20 illustrates a visual or graphical user interface (GUI) or rating element operable to generate both value and desirability ratings for a product and/or purchase. The GUI is characterized by a box 2010 with labels on each of its four sides with desirability labels 2040, 2050 being opposite each and value labels 2060, 2070 likewise being opposite. It is further characterized as consisting of a target graphic 2030 placed within box 2010 that is movable within its bounds. The GUI is then operable via an input device (e.g., mouse, keyboard, touchscreen) wherein the user drags and drops the target 2030 at a position within the box 2010 that represents the user's assessment of the purchase and/or product. The proximity of the target to a particular label signifies the user's intent to rate the purchase and/or product in such a manner. In the embodiment shown, a positioning of the target 2030 in the bottom left corner would signify a 0% desirability and 0% value user assessment, and a positioning of the target 2030 in the top right corner would signify a 100% desirability and 100% value user assessment. It should be understood that other textual descriptors 2040, 2050, 2060, 2070 may be used to connote the notions of desirability and that "cool," "lame," "worth it," and "not worth it" are for demonstration. Likewise it should be understood that the target graphic 2030 is for demonstration and that any icon signifying the location with the box 2010 can be used. Furthermore, the shape of box 2030 may be any shape such as, but not limited to, a circle, oval, or rectangle.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution or interpretation system, apparatus, or device, such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution or interpretation system, apparatus, or device. The computer readable medium can be, for example but not limited to, an electronic, magnetic, optical, electro-magnetic, infrared, or semiconductor system, apparatus, or device. In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the herein-described embodiments of the present disclosure are merely possible examples of implementations, merely set forth for a clear understanding of the principles of the disclosure. Any process descriptions or blocks in flow charts should be understood as representing modules, segments, or portions of code which include one or more executable instructions for implementing specific logical functions or steps in the process, and alternate implementations are included in which functions are not be included or executed at all, are executed out of order from that shown or discussed, including substantially concurrently or in reverse order, depending on the functionality involved, as would be understood by those reasonably skilled in the art of the present disclosure. Many variations and modifications are made to the above-described embodiment(s) without departing substantially from the spirit and principles of the present disclosure. Further, the scope of the present disclosure is intended to cover all combinations and sub-combinations of all elements, features, and aspects discussed above. In addition, while many functions and features are disclosed as being in separate embodiments, it should be understood that the present disclosure includes all combinations and sub-combinations of functions disclosed as being in separate embodiments, including user-selectable modes and methods of operation to achieve alternative functions. More generally, all modifications and variations are intended to be included herein within the scope of this disclosure, and all possible claims to individual aspects or combinations of elements or steps are intended to be supported by this disclosure.

The invention claimed is:

1. A computer-implemented method comprising:
providing, by a computer, a social network, the social network being configured to enable a user to create a user account on the social network;
obtaining, by the computer, user data associated with the user account;
obtaining, by the computer, product information associated with an identified product from a product database;
obtaining, by the computer, a user-generated rating of the identified product, the user-generated rating obtained through a user rating interface having a value scale and a desirability scale, the user rating interface comprising a two-dimensional rating screen incorporating the value scale and the desirability scales and a target controllably positioned by the user on the two-dimensional rating screen representing the user's rating with respect to the value scale and the desirability scale; and
transmitting, by the computer, the user data associated with the user account, the product information associated with the identified product, and the user-generated rating of the identified product to the social network to cause the social network to publish the product information associated with the identified product and the user-generated rating of the identified product to the user account.

2. The computer-implemented method of claim 1, wherein obtaining the product information further comprises transmitting, by the computer, a request for the product information to a product information service.

3. The computer-implemented method of claim 1, further comprising obtaining, by the computer, purchase information associated with a user purchase, and wherein obtaining the user data, obtaining the purchase information, and obtaining the product information comprises electronically receiving, by the computer, the user data and product information from a retailer from which the user purchased the identified product.

4. The computer-implemented method of claim 1, wherein transmitting the user data and product information further comprises causing, by the computer, the social network to publish the user data and product information through the user account.

5. The computer-implemented method of claim 1, further comprising obtaining, by the computer, purchase information associated with a user purchase, and further comprising storing, by the computer, the user data, purchase information, and product information in a database.

6. The computer-implemented method of claim 5, further comprising storing, by the computer, user data for a plurality of users, purchase information for a plurality of purchases, and product information for a plurality of products in the database.

7. The computer-implemented method of claim 1, wherein obtaining product information further comprises:
receiving, by the computer, a request from a user device regarding the identified product; and
retrieving, by the computer, the product information from a web server associated with a product information service.

8. The computer-implemented method of claim 1, further comprising obtaining, by the computer, from a user device a code that identifies the product.

9. The computer-implemented method of claim 8, wherein the code comprises one of a Universal Product Code (UPC), QR code, Electronic Product Code (EPC), radio frequency identification (RFID) signal, or a barcode.

10. The computer-implemented method of claim 1, further comprising transmitting, by the computer, the product and purchase information via a communication network using an applications programming interface (API) to a web server associated with a third party web service, the third party web service being configured to:
receive product information from a plurality of sources;
receive tabulated product information for a plurality of products;
receive tabulated purchase information for a plurality of purchases; and
enable a plurality of users to access the product information and the purchase information for the plurality of products and purchases.

11. A computer program embodied on a non-transitory computer-readable medium, the computer program comprising:
logic adapted to obtain user data associated with a user having an account with a social network;
logic adapted to obtain product information associated with an identified product;
logic adapted to transmit the user data and product information to the social network for publication; and
logic adapted to enable the user to rate the product, wherein the logic adapted to enable the user to rate the product is further adapted to enable a user rating interface having a value scale and a desirability scale, the user rating interface comprising a two-dimensional rating screen incorporating the value scale and the desirability scales and a target controllably positioned on the two-dimensional rating screen representing the user's rating with respect to the value scale and the desirability scale.

12. The computer program of claim 11, wherein the logic adapted to transmit the user data and product information to the social network is further adapted to cause the social network to publish the product information through the account associated with the user.

13. The computer program of claim 11, further comprising logic adapted to store user information.

14. The computer program of claim 13, wherein the logic adapted to store user information is further adapted to store information related to a plurality of users, a plurality of products, and a plurality of purchase information.

15. The computer program of claim 11, further comprising logic adapted to communicate with a web server associated with a retailer, wherein the user data is obtained through a retailer loyalty card associated with a purchase of the product via a point-of-sale device associated with the retailer, the point-of-sale device being in communication with the web server.

16. The computer program of claim 11, further comprising:
logic adapted to receive a request from a user device regarding the identification of the product; and
logic adapted to obtain the product information from a web server associated with a product information service.

17. A computer-implemented system comprising:
a processing device associated with a computer system, the processing device configured to execute instructions; and
a memory device in communication with the processing device, the memory device configured to store the instructions that are executable by the processing device, the instructions comprising at least
logic adapted to provide a social network, the social network being configured to enable a user to create a user account on the social network,
logic adapted to obtain user data associated with the user account,
logic adapted to obtain product information associated with an identified product from a product database,
logic adapted to transmit the user data associated with the user account and product information associated with the identified product to the social network to cause the social network to publish the product information associated with the identified product to the user account, and
logic adapted to enable the user to rate the product, wherein the logic adapted to enable the user to rate the product is further adapted to enable a user rating interface having a value scale and a desirability scale, the user rating interface comprising a two-dimensional rating screen incorporating the value scale and the desirability scales and a target controllably positioned on the two-dimensional rating screen representing the user's rating with respect to the value scale and the desirability scale.

18. The computer-implemented system of claim 17, wherein the logic adapted to transmit the user data and product information is further adapted to cause the social network to publish the product information through the user account.

19. The computer-implemented system of claim 17, wherein the logic adapted to store the user data is further adapted to store information related to a plurality of users, a plurality of products, and a plurality of purchase information.

20. The computer-implemented system of claim 17, wherein the logic adapted to transmit publication information is further adapted to communicate via a communication network using an Applications Programming Interface (API) or web-based interface.

21. The computer-implemented system of claim 17, wherein:
   the logic adapted to obtain product information is further adapted to obtain the product information and user data from a web server associated with a retailer;
   the user data is obtained from a retailer loyalty card associated with a purchase of the product via a point-of-sale device associated with the retailer; and
   the point-of-sale device is in communication with the web server.

22. The computer-implemented system of claim 17, wherein the logic adapted to obtain user data and product information is coupled with a user device configured to obtain a code that identifies the product.

23. The computer-implemented system of claim 22, wherein the code comprises one of a Universal Product Code (UPC), QR code, Electronic Product Code (EPC), radio frequency identification (RFID) signal, or a barcode.

24. The computer-implemented system of claim 17, further comprising a user interface configured to enable the user to publish the product data on the social network.

25. The computer-implemented system of claim 17, further comprising logic adapted to electronically distribute advertising information and coupons regarding the product.

* * * * *